United States Patent
Lim et al.

(10) Patent No.: US 11,787,939 B2
(45) Date of Patent: Oct. 17, 2023

(54) POLYAMIDE COMPOSITIONS AND ARTICLES MADE THEREFROM

(71) Applicant: INV NYLON POLYMERS AMERICAS, LLC, Wilmington, DE (US)

(72) Inventors: Chee Sern Lim, Kennesaw, GA (US); Isaac Iverson, Wichita, KS (US); John Buzinkai, Chattanooga, TN (US)

(73) Assignee: INV NYLON POLYMERS AMERICAS, LLC, Wilmington, DE (US)

(*) Notice: Subject to any disclaimer, the term of this patent is extended or adjusted under 35 U.S.C. 154(b) by 0 days.

(21) Appl. No.: 17/437,314

(22) PCT Filed: Oct. 16, 2020

(86) PCT No.: PCT/IB2020/059765
§ 371 (c)(1),
(2) Date: Sep. 8, 2021

(87) PCT Pub. No.: WO2021/079244
PCT Pub. Date: Apr. 29, 2021

(65) Prior Publication Data
US 2022/0243060 A1    Aug. 4, 2022

Related U.S. Application Data

(60) Provisional application No. 63/071,715, filed on Aug. 28, 2020, provisional application No. 63/071,728, filed on Aug. 28, 2020, provisional application No. 63/013,884, filed on Apr. 22, 2020, provisional application No. 62/925,524, filed on Oct. 24, 2019.

(51) Int. Cl.
| | |
|---|---|
| *C08L 77/06* | (2006.01) |
| *C08L 23/26* | (2006.01) |
| *C08L 51/06* | (2006.01) |
| *B32B 1/08* | (2006.01) |
| *B32B 5/02* | (2006.01) |
| *B32B 15/085* | (2006.01) |
| *B32B 15/088* | (2006.01) |
| *B32B 27/12* | (2006.01) |
| *B29C 48/00* | (2019.01) |
| *C08K 7/14* | (2006.01) |

(52) U.S. Cl.
CPC ............ *C08L 77/06* (2013.01); *B29C 48/022* (2019.02); *B32B 1/08* (2013.01); *B32B 5/02* (2013.01); *B32B 15/085* (2013.01); *B32B 15/088* (2013.01); *B32B 27/12* (2013.01); *C08K 7/14* (2013.01); *C08L 23/26* (2013.01); *C08L 51/06* (2013.01); *B32B 2262/103* (2013.01); *B32B 2307/3065* (2013.01); *B32B 2597/00* (2013.01); *C08K 2201/019* (2013.01); *C08L 2203/30* (2013.01); *C08L 2205/025* (2013.01); *C08L 2205/03* (2013.01)

(58) Field of Classification Search
CPC .. C08L 51/00–006; C08L 51/04; C08L 51/06; C08L 2205/02; C08L 2205/025; C08L 2205/03; C08L 23/26
See application file for complete search history.

(56) References Cited

U.S. PATENT DOCUMENTS

| | | |
|---|---|---|
| 3,484,403 A | 12/1969 | Brunson et al. |
| 4,362,846 A | 12/1982 | Korber et al. |
| 4,532,100 A | 7/1985 | Lancaster et al. |
| 4,696,636 A | 9/1987 | Evely |
| 4,707,513 A | 11/1987 | Baer |
| 4,900,786 A | 2/1990 | Abolins et al. |
| 4,970,255 A | 11/1990 | Reimann et al. |
| 5,047,479 A | 9/1991 | Ohmae et al. |
| 5,112,908 A | 5/1992 | Epstein |
| 5,122,570 A | 6/1992 | Subramanian |
| 5,194,578 A | 3/1993 | Anton |
| 5,266,655 A | 11/1993 | Prevost et al. |
| 5,332,777 A | 7/1994 | Goetz et al. |
| 5,560,398 A | 10/1996 | Pfleger |
| 5,576,387 A | 11/1996 | Chambers |
| 5,811,490 A | 9/1998 | Jozokos et al. |
| 5,846,478 A | 12/1998 | Onishi et al. |

(Continued)

FOREIGN PATENT DOCUMENTS

| | | |
|---|---|---|
| CA | 2130476 A1 | 6/1994 |
| CN | 102993744 A * | 3/2013 |

(Continued)

OTHER PUBLICATIONS

WO 02/066558 A1 (2002) machine translation.*
CN 102993744 A machine translation (Mar. 2013).*
ASPI series Parison Suction Machine, Retrieved from Internet URL : https://www.st-blowmoulding.com/products/parison-suction-aspi-series, 05 Pages, Oct. 22, 2021.
BYK, Supplier of Specialty Chemicals, Retrieved from Internet URL: https://www.byk.com/en, 07 Pages, Oct. 22, 2021.
Campus®—a material information system for the plastics industry, Retrieved from Internet URL: https://www.campusplastics.com/campus/en/datasheet, 01 Page, Oct. 20, 2021.
Caroline Gold, "UL-94—Test for Flammability of Plastic Materials for Parts in Devices and Appliances" Laird Technologies, Retrieved from Internet URL: http://cdn.lairdtech.com/home/brandworld/files/EMI%20UL-94%20Test%20for%20Flammability%20of%20Plastic%20Materials%20for%20Parts%20in%20Devices%20and%20Appliances%20Technical%20Note%20Download.pdf, 2 Pages, Oct. 20, 2021.

(Continued)

*Primary Examiner* — Ana L. Woodward

(57) ABSTRACT

The present disclosure relates to compositions and compounded compositions including polyamide and a maleated polyolefin, articles formed from the same such as extruded or molded articles, and methods of making the compositions and articles. A composition includes a condensation polyamide that is at least 30 wt % of the composition and that is the predominant polyamide in the composition. The composition also includes from ≥10 wt % to ≤50 wt % of a maleic anhydride grafted polyolefin having a grafted maleic anhydride incorporation of ≥0.05 to ≤1.5 wt % based on total weight of the maleated polyolefin.

22 Claims, No Drawings

(56) References Cited

U.S. PATENT DOCUMENTS

| | | | |
|---|---|---|---|
| 6,242,503 B1* | 6/2001 | Kozma | C08L 23/06 525/193 |
| 6,733,854 B2 | 5/2004 | Lee et al. | |
| 6,908,573 B2 | 6/2005 | Hossan | |
| 7,199,188 B2 | 4/2007 | Chou | |
| 7,419,721 B2 | 9/2008 | Beerda et al. | |
| 7,807,245 B2 | 10/2010 | Bersted et al. | |
| 7,858,172 B2 | 12/2010 | Imaizumi et al. | |
| 7,862,872 B2 | 1/2011 | Baumert et al. | |
| 7,897,689 B2 | 3/2011 | Harris et al. | |
| 8,133,561 B2 | 3/2012 | Schmitz et al. | |
| 8,192,664 B2 | 6/2012 | Polk, Jr. et al. | |
| 8,227,543 B2 | 7/2012 | Bizet et al. | |
| 8,236,412 B2 | 8/2012 | Jousset et al. | |
| 8,496,854 B2 | 7/2013 | Mercx et al. | |
| 8,541,502 B2 | 9/2013 | Martinez et al. | |
| 8,618,209 B2 | 12/2013 | Lee et al. | |
| 8,658,757 B2 | 2/2014 | Uehira et al. | |
| 8,932,693 B2 | 1/2015 | Hoffmann et al. | |
| 9,018,292 B2 | 4/2015 | Jeol et al. | |
| 9,120,888 B2 | 9/2015 | Karjala et al. | |
| 9,133,965 B2 | 9/2015 | Goering et al. | |
| 9,156,982 B2 | 10/2015 | Amici et al. | |
| 9,200,095 B2 | 12/2015 | Tran et al. | |
| 9,243,090 B2 | 1/2016 | Arriola et al. | |
| 9,303,156 B2 | 4/2016 | Weeks et al. | |
| 9,353,262 B2 | 5/2016 | Tarbit | |
| 9,388,312 B2 | 7/2016 | Bhatia | |
| 9,409,353 B2 | 8/2016 | Orange et al. | |
| 9,441,085 B2 | 9/2016 | Norfolk | |
| 9,493,642 B2 | 11/2016 | Kito et al. | |
| 9,676,940 B2 | 6/2017 | Lamberts et al. | |
| 9,856,375 B2 | 1/2018 | Jeol et al. | |
| 9,950,566 B2 | 4/2018 | Hara | |
| 9,978,897 B2 | 5/2018 | Aussedat et al. | |
| 10,017,642 B2 | 7/2018 | Kobayashi et al. | |
| 10,053,574 B2 | 8/2018 | Brindle, Jr. et al. | |
| 10,301,469 B2 | 5/2019 | Jung et al. | |
| 10,351,671 B2 | 7/2019 | Wilms et al. | |
| 10,435,559 B2 | 10/2019 | Adur | |
| 10,494,525 B2 | 12/2019 | Yalcin | |
| 10,577,478 B2 | 3/2020 | Fujii et al. | |
| 10,711,104 B2 | 7/2020 | Benstead et al. | |
| 10,717,816 B2 | 7/2020 | Aepli et al. | |
| 10,800,918 B2 | 10/2020 | Sabard et al. | |
| 10,800,919 B2 | 10/2020 | Adur et al. | |
| 10,894,852 B2 | 1/2021 | Bawiskar et al. | |
| 10,934,433 B2 | 3/2021 | Jung et al. | |
| 11,065,854 B2 | 7/2021 | Stöppelmann | |
| 11,254,083 B2 | 2/2022 | Caviezel | |
| 11,339,292 B2 | 5/2022 | Dreux et al. | |
| 11,459,458 B2 | 10/2022 | Sparks et al. | |
| 11,485,858 B2 | 11/2022 | Sparks et al. | |
| 2004/0204545 A1 | 10/2004 | Pagilagan et al. | |
| 2004/0209021 A1 | 10/2004 | Shih | |
| 2005/0113532 A1 | 5/2005 | Fish et al. | |
| 2007/0021558 A1 | 1/2007 | Shinohara et al. | |
| 2007/0155877 A1 | 7/2007 | Shinohara | |
| 2008/0064826 A1 | 3/2008 | Shinohara | |
| 2008/0220271 A1 | 9/2008 | Baumert et al. | |
| 2011/0027512 A1 | 2/2011 | Lee et al. | |
| 2011/0155359 A1 | 6/2011 | Doshi | |
| 2011/0207838 A1 | 8/2011 | Lima | |
| 2011/0220236 A1 | 9/2011 | Kettl et al. | |
| 2011/0220667 A1* | 9/2011 | Pfleghar | B32B 1/02 220/660 |
| 2011/0224360 A1 | 9/2011 | Park et al. | |
| 2011/0229672 A1 | 9/2011 | Hoffmann et al. | |
| 2012/0029133 A1 | 2/2012 | Stoppelmann et al. | |
| 2012/0123041 A1 | 5/2012 | Zaher et al. | |
| 2012/0178325 A1* | 7/2012 | Wakeman | C08L 77/06 442/152 |
| 2012/0196962 A1 | 8/2012 | Kobayashi et al. | |
| 2012/0279605 A1 | 11/2012 | Nozaki et al. | |
| 2013/0137344 A1 | 5/2013 | Liu et al. | |
| 2013/0171388 A1 | 7/2013 | Pawlik et al. | |
| 2013/0190443 A1 | 7/2013 | Margraf et al. | |
| 2013/0209795 A1 | 8/2013 | Liu | |
| 2013/0338261 A1 | 12/2013 | Center et al. | |
| 2014/0000707 A1 | 1/2014 | Bizet et al. | |
| 2014/0023808 A1* | 1/2014 | Bzducha | B29C 45/0001 525/66 |
| 2014/0026960 A1 | 1/2014 | Bizet et al. | |
| 2014/0031476 A1 | 1/2014 | Bhatia | |
| 2014/0206800 A1 | 7/2014 | Wu et al. | |
| 2014/0309367 A1* | 10/2014 | Bradley | C08G 69/48 525/426 |
| 2015/0017439 A1 | 1/2015 | Pontarin | |
| 2015/0104598 A1 | 4/2015 | Bhatia | |
| 2015/0126652 A1 | 5/2015 | Adur et al. | |
| 2016/0152829 A1 | 6/2016 | Sabard et al. | |
| 2017/0204264 A1 | 7/2017 | Adur et al. | |
| 2017/0335999 A1 | 11/2017 | Ochiai et al. | |
| 2018/0030253 A1 | 2/2018 | Barion | |
| 2018/0043656 A1 | 2/2018 | Song et al. | |
| 2018/0237598 A1 | 8/2018 | Guo et al. | |
| 2019/0055402 A1 | 2/2019 | I | |
| 2019/0127579 A1 | 5/2019 | Kim et al. | |
| 2019/0136053 A1 | 5/2019 | Takamasa et al. | |
| 2019/0218392 A1 | 7/2019 | Theiler et al. | |
| 2019/0352505 A1 | 11/2019 | Sato et al. | |
| 2019/0358939 A1 | 11/2019 | Ophardt et al. | |
| 2020/0019211 A1 | 1/2020 | Li et al. | |
| 2020/0040183 A1 | 2/2020 | Krishnaswamy | |
| 2020/0087458 A1 | 3/2020 | Ieda et al. | |
| 2020/0198211 A1 | 6/2020 | Hoffmann et al. | |
| 2020/0216627 A1 | 7/2020 | Hochstetter et al. | |
| 2020/0247994 A1 | 8/2020 | Sparks et al. | |
| 2020/0332118 A1 | 10/2020 | Aepli | |
| 2020/0332120 A1 | 10/2020 | Kim | |
| 2022/0081564 A1 | 3/2022 | Buzinkai | |
| 2022/0204764 A1 | 6/2022 | Alkan et al. | |
| 2022/0243060 A1 | 8/2022 | Lim et al. | |

FOREIGN PATENT DOCUMENTS

| | | |
|---|---|---|
| CN | 102653594 B | 8/2013 |
| CN | 103978651 A | 8/2014 |
| CN | 104448813 A | 3/2015 |
| CN | 103360599 B | 8/2016 |
| CN | 103892569 B | 11/2016 |
| CN | 106433110 A | 2/2017 |
| CN | 106589353 A | 4/2017 |
| CN | 107057339 A | 8/2017 |
| CN | 105176077 B | 10/2017 |
| CN | 107254166 B | 10/2017 |
| CN | 108239281 A | 7/2018 |
| CN | 108329574 A | 7/2018 |
| CN | 109553965 A | 4/2019 |
| CN | 109921144 A | 6/2019 |
| CN | 110305474 A | 10/2019 |
| CN | 110964316 A | 4/2020 |
| CN | 111087808 A | 5/2020 |
| CN | 115003757 A | 9/2022 |
| DE | 2722270 A1 | 12/1977 |
| DE | 3200428 A1 | 7/1983 |
| DE | 102008008098 A1 | 8/2009 |
| DE | 102020208547 A1 | 1/2021 |
| EP | 0270247 A2 | 6/1988 |
| EP | 0452305 B1 | 11/1994 |
| EP | 0397531 B1 | 8/1995 |
| EP | 0693532 A2 | 1/1996 |
| EP | 0751864 B1 | 6/1998 |
| EP | 1076077 A1 | 2/2001 |
| EP | 1522555 B1 | 2/2007 |
| EP | 2414446 B1 | 2/2013 |
| EP | 2562219 A1 | 2/2013 |
| EP | 2196489 B1 | 8/2013 |
| EP | 1468047 B1 | 9/2016 |
| EP | 2392611 B1 | 4/2017 |
| EP | 2700103 B1 | 11/2017 |
| EP | 1448696 B1 | 10/2018 |
| EP | 2872568 B1 | 6/2019 |
| EP | 1858937 B1 | 9/2019 |

(56) References Cited

FOREIGN PATENT DOCUMENTS

| | | |
|---|---|---|
| EP | 3411429 B1 | 6/2020 |
| FR | 3018280 B1 | 5/2017 |
| GB | 1519355 A | 7/1978 |
| GB | 2456828 A | 7/2009 |
| JP | H06234888 A | 8/1994 |
| JP | H0770822 A | 3/1995 |
| JP | 2788767 B2 | 8/1998 |
| JP | 2006291118 A | 10/2006 |
| JP | 2019014808 A | 1/2019 |
| JP | 2019129236 A | 8/2019 |
| JP | 6922428 B2 | 8/2021 |
| KR | 101500004 B1 | 3/2015 |
| KR | 20170024616 A | 3/2017 |
| KR | 20190054514 A | 5/2019 |
| KR | 102082420 B1 | 2/2020 |
| KR | 20210109233 A | 9/2021 |
| TW | 201302852 A | 1/2013 |
| WO | 9824847 A1 | 6/1998 |
| WO | WO 02/066558 A1 * | 8/2002 |
| WO | 2008101647 A1 | 8/2008 |
| WO | 2008105878 A1 | 9/2008 |
| WO | 2009098305 A2 | 8/2009 |
| WO | 2010014791 A1 | 2/2010 |
| WO | 2012024268 A1 | 2/2012 |
| WO | 2012098063 A1 | 7/2012 |
| WO | 2013033287 A2 | 3/2013 |
| WO | 2014018738 A1 | 1/2014 |
| WO | 2014100000 A2 | 6/2014 |
| WO | 2016053965 A1 | 4/2016 |
| WO | 2016168306 A2 | 10/2016 |
| WO | 2018075320 A1 | 4/2018 |
| WO | 2019012064 A1 | 1/2019 |
| WO | 2019125379 A1 | 6/2019 |
| WO | 2019233949 A1 | 12/2019 |
| WO | 2020018608 A1 | 1/2020 |
| WO | WO-2020018608 A1 | 1/2020 |
| WO | 2020027299 A1 | 2/2020 |
| WO | 2020038152 A1 | 2/2020 |
| WO | 2020104412 A1 | 5/2020 |
| WO | 2020249899 A1 | 12/2020 |
| WO | 2021063835 A1 | 4/2021 |
| WO | 2021079244 A1 | 4/2021 |
| WO | 2022160351 A1 | 8/2022 |
| WO | 2022168020 A1 | 8/2022 |
| WO | 2022187453 A1 | 9/2022 |
| WO | 2022208319 A1 | 10/2022 |
| WO | 2022209138 A1 | 10/2022 |
| WO | 2022224219 A1 | 10/2022 |

OTHER PUBLICATIONS

Chiu et al. "Fabrication and characterization of polyamide 6,6/ organo-montmorillonite nanocomposites with and without a maleated polyolefin elastomer as a toughener", Retrieved from Internet URL: https://doi.org/10.1016/j.polymer.2007.11.057,Polymer, vol. 49, Issue 4, pp. 1015-1026, Feb. 18, 2008 (Abstract).
Dieffenbacher, Retrieved from Internet URL: https://dieffenbacher.com/en/, 07 Pages, Oct. 20, 2021.
Dieffenbacher,"LFT (Long Fiber Thermoplast)", Retrieved from Internet URL: https://dieffenbacher.com/en/composites/technologies/lft-long-fiber-thermoplast, 04 Pages, 2021.
Econcore thermoplastic honeycomb core technology, Retrieved from Internet URL: https://econcore.com/en/technology/thermhex, 05 Pages, Oct. 22, 2021.
Emco Industrial Plastics, Retrieved from Internet URL: https://www.emcoplastics.com/ 05 Pages, Oct. 22, 2021.
Goettfert, Retrieved from Internet URL: https://www.goettfert.com/, 03 Pages, Oct. 20, 2021.
International Search Report received for PCT Application No. PCT/IB2020/059765, dated Mar. 31, 2021, 08 Pages.
Liu et al. "Morphology and dynamic mechanical properties of long glass fiber-reinforced polyamide 6 composites", Retrieved from Internet URL: http://dx.doi.org/10.1007/s10973-016-5601-9, Journal of Thermal Analysis and Calorimetry, vol. 126, pp. 1281-1288, Jun. 21, 2016 (Abstract).
Omnexus,"Flammability UL94-Preliminary Screening of Plastics for Fire Performance", Retrieved from Internet URL: https://omnexus.specialchem.com/polymer-properties/properties/flammability-ul94, 09 Pages, 2021.
Vertellus, Retrieved from Internet URL: https://vertellus.com/, 03 Pages, Oct. 20, 2021.
EP office action received for Application No. 20797876.8 dated Mar. 17, 2022, 4 pages.
International Search Report and Written Opinion mailed in International Patent Application No. PCT/IB2020/059765 dated Mar. 31, 2021.
Office Action received for EP Application No. 20797876.8, dated Sep. 22, 2022, 07 Pages.
BYK-Gardner; Retrieved from Internet URL: https://www.byk.com/en, Apr. 27, 2021, 7 pages.
ExxonMobil, "ExxelorTM VA 1801 ", Polymer Resin, Retrieved on Jun. 29, 2021, 02 pages.
Horiuchi, S et al., "Compatibilizing effect of a maleic anhydride functionalized SEBS triblock elastomer through a reaction induced phase formation in the blends of polyamide6 and polycarbonate—III. Microscopic studies on the deformation mechanism", Polymer, Elsevier, vol. 38, No. 26, 1997, pp. 6317-6326.
International Search Report and Written Opinion received for PCT Application No. PCT/GB2022/051604, dated Sep. 2, 2022, 26 pages.
International Search Report and Written Opinion received for PCT Application No. PCT/IB2021/060365, dated Jan. 14, 2022, 10 pages.
International Search Report and Written Opinion received for PCT Application No. PCT/IB2021/061878, dated Aug. 18, 2022, 6 pages.
International Search Report and Written Opinion received for PCT Application No. PCT/IB2022/051045, dated Apr. 20, 2022, 14 pages.
International Search Report and Written Opinion received for PCT Application No. PCT/IB2022/052850, dated Jun. 21, 2022, 17 pages.
International Search Report and Written Opinion received for PCT Application No. PCT/IB2022/053788, dated Sep. 23, 2022, 28 pages.
International Search Report and Written Opinion received for PCT application No. PCT/IB2022/061509, dated Mar. 15, 2023, 14 Pages.

* cited by examiner

POLYAMIDE COMPOSITIONS AND ARTICLES MADE THEREFROM

CROSS REFERENCE TO RELATED APPLICATIONS

This application is a national phase entry of International Application No. PCT/IB2020/059765, filed on Oct. 16, 2020, which claims the benefit of priority to U.S. Provisional Patent Application Ser. No. 62/925,524 filed Oct. 24, 2019, U.S. Provisional Patent Application Ser. No. 63/013,884 filed Apr. 22, 2020, U.S. Provisional Patent Application Ser. No. 63/071,715 filed Aug. 28, 2020, and U.S. Provisional Patent Application Ser. No. 63/071,728 filed Aug. 28, 2020, the disclosures of which are incorporated herein in its entirety by reference.

FIELD

The present disclosure provides polyamide compositions, methods for making the compositions and polyamide parts extruded or molded from the compositions.

BACKGROUND

Prior attempts at making pipeline articles from thermoplastic condensation polyamide resins, for example, polyhexamethyleneadipamide (Nylon-6,6 or N66 or PA66) have shown limited success. Additional thermoplastic resin materials used in production of pipes include polyamide 11 (e.g. coiled N11 high pressure gas pipes at diameters up to 2 inches have been disclosed by Arkema); polyamide 12 (e.g. Evonik Degussa VESTAMID® NRG Polyamide 12 pipe, UBESTA polyamide 12 for burial and rehabilitation of existing cast iron and steel gas mains); polyamide 612 (e.g. DuPont PIPELON® polyamide 612 pipe) and polyvinylidene difluoride (PVDF).

Thermoplastic condensation polyamide resins that are molded or extruded suffer from insufficient properties for various end uses such as automotive, electronics, chemical processing, and heat transfer applications. Various thermoplastic condensation polyamide resins that are molded or extruded have lower tensile strength, lower chemical resistance, lower stress cracking resistance, or higher melt viscosities (e.g., making extrusion difficult or impossible), than available HDPE, N11, N12, N612 and PVDF materials, especially in pipeline construction.

International Application Publication No. WO2012/024268A1 relates to a thermoplastic pelletizable polymer composition including: (a) a polyamide; and (b) a polymer polymerized from maleic anhydride and an olefin; wherein the polyamide and the polymer are compounded.

U.S. Pat. No. 9,353,262 discloses compositions including polyamides with such olefin-maleic anhydride polymers (OMAP).

International Application Publication No. WO2014/100000A2 relates to polyamide compositions including 60 to 99.9% by weight of a polyamide and 0.5 to 40% by weight of an impact modifier containing maleic anhydride or a functional equivalent thereof. In these compositions, the moisture level is less than the equilibrium moisture content of the polyamide.

International Application Publication No. WO2016/168306A2 relates to hydrophobic thermoplastic nylon compositions and to pipes and hollow conduits and to methods for making the same.

European Patent Application Publication No. EP2562219A1 relates to thermoplastic molded substances with increased hydrolysis resistance.

International Application Publication No. WO2012098063A1 relates to hydrolysis-stable polyamides.

International Application Publication No. WO2010014791A1 relates to heat resistant thermoplastic articles including polyhydroxy polymers.

German Patent Application Publication No. DE102008008098A1 relates to polyamide—elastomer—mixtures having improved resistance to hydrolysis. The polyamide-elastomer blends can be processed to molded articles useful in the automotive sector.

International Application Publication No. WO2009098305A1 relates to polyamide-elastomer mixtures having improved hydrolysis resistance. The polyamide-elastomer mixtures can be processed into molded parts used in the automotive field.

International Application Ser. No. PCT/US19/42101, filed 17 Jul. 2019 relates fiber including nylon-6,6 and maleated polyolefin exhibiting enhanced stain resistance.

SUMMARY OF THE INVENTION

The present invention provides a composition including a condensation polyamide. The condensation polyamide is at least 30 wt % of the composition. The condensation polyamide is the predominant polyamide in the composition. The condensation polyamide can be one or more polyamides. The composition includes from ≥10 wt % to ≤50 wt % of a maleated polyolefin (e.g., ≥15 wt % to ≤50 wt %). The maleated polyolefin includes maleic anhydride grafted onto a polyolefin backbone. The maleated polyolefin has a grafted maleic anhydride incorporation of ≥0.05 to ≤1.5 wt % based on total weight of the maleated polyolefin. The condensation polyamide can be any one or more suitable condensation polyamides. The maleated polyolefin, or domains thereof, is/are uniformly distributed in the condensation polyamide or in the composition; the condensation polyamide can have an AEG of ≥65 milliequivalents per kg (meq/kg) and ≤130 meq/kg (e.g., ≥70 meq/kg and ≤125 meq/kg); the condensation polyamide can have an RV of at least 35 (e.g., at least 40, or at least 45, as determined according to ASTM D789); the condensation polyamide can include nylon 66/6T, nylon 66/DI, nylon 66, or a combination thereof; or a combination thereof.

The present invention provides a composition including a condensation polyamide having an AEG of ≥65 milliequivalents per kg (meq/kg) and ≤130 meq/kg (e.g., ≥70 meq/kg and ≤125 meq/kg). The condensation polyamide is at least 30 wt % of the composition. The condensation polyamide is the predominant polyamide in the composition. The composition also includes from ≥10 wt % to ≤50 wt % of a maleated polyolefin (e.g., ≥15 wt % to ≤50 wt %). The maleated polyolefin includes maleic anhydride grafted onto a polyolefin backbone, the maleated polyolefin having a grafted maleic anhydride incorporation of ≥0.05 to ≤1.5 wt % based on total weight of the maleated polyolefin.

The present invention provides a composition including a condensation polyamide. The condensation polyamide is at least 30 wt % of the composition. The condensation polyamide is the predominant polyamide in the composition. The condensation polyamide can be one or more polyamides. The composition includes from ≥10 wt % to ≤50 wt % of a maleated polyolefin (e.g., ≥15 wt % to ≤50 wt %). The maleated polyolefin includes maleic anhydride grafted onto a polyolefin backbone. The maleated polyolefin has a grafted maleic anhydride incorporation of ≥0.05 to ≤1.5 wt % based on total weight of the maleated polyolefin. The condensation polyamide can be any one or more suitable condensation polyamides. The maleated polyolefin, or domains thereof, or a reaction product of the maleated polyolefin, is/are uniformly distributed in the condensation polyamide or in the composition.

The present invention provides a reacted composition that is a reaction product of the composition including the condensation polyamide and the maleated polyolefin. The reacted composition can include a reaction product of the condensation polyamide and the maleated polyolefin, such as a polyamide-polyolefin copolymer formed from at least partial reaction of the condensation polyamide and the maleated polyolefin.

The present invention provides a compounded polyamide composition. The compounded polyamide composition includes the composition including the condensation polyamide and the maleated polyolefin and/or a reaction product of the composition. The compounded polyamide composition also includes one or more other components.

In various aspects, the compounded polyamide composition includes the composition including the condensation polyamide and the maleated polyolefin, or the reaction product thereof, wherein the maleated polyolefin is ≥10 to ≤50 wt % of the compounded polyamide composition. The compounded polyamide composition includes an additional polyamide that is ≥15 to ≤85 wt % of the compounded polyamide composition (e.g., ≥20 to ≤85 wt %), such as nylon 66, nylon 612, nylon 610, nylon 12, nylon 6, nylon 66/6T, nylon 66/DI, nylon 66/D6, nylon 66/DT, nylon 66/610, nylon 66/612, a polyamide copolymer, or a combination thereof. The compounded polyamide composition also includes a chain extender that is ≥0.05 to ≤5 wt % of the compounded polyamide composition.

In various aspects, the compounded polyamide composition includes the composition including the condensation polyamide and the maleated polyolefin, or the reaction product thereof (e.g., the condensation polyamide and the maleated polyolefin are optionally partially reacted to form a polyamide-polyolefin), wherein the condensation polyamide is 50-80 wt % of the compounded polyamide composition, and wherein the maleated polyolefin is 10-50 wt % of the compounded polyamide composition. The compounded polyamide composition also includes 0 to 20 wt % polyamide 612; 0 to 20 wt % modified polyphenylene ether; 0 to 30 wt % flame retardant; 0 to 10 wt % combined chain extender, heat stabilizer and colorant additives; and 0 to 40 wt % combined filler and/or conductive fiber additives.

The present invention provides an article that includes the composition including the condensation polyamide and the maleated polyolefin, or the reaction product thereof, or the compounded polyamide composition including one or both of the same.

In various aspects, the article can be characterized by superior resistance, when compared against a control, to at least one selected from: cold-temperature cracking, urea exposure, fuel exposure, oil exposure, high-temperature exposure, hydrolysis, glycolysis, and salt exposure.

In various aspects, the article is an extrudate, such as a conduit. In various aspects, the extrudate can be substantially free of glass fibers and/or can be resistant to glycolysis.

In various aspects, the article is a molded article. In various aspects, the molded article can include glass fibers and/or can be resistant to cold-temperature cracking.

The present invention provides a method of making the composition including the condensation polyamide and the maleated polyolefin, or the reaction product thereof, or the compounded polyamide composition including one or both of the same. The method can include combining the condensation polyamide and the maleated polyolefin to form the composition, the reacted composition, the compounded composition, or a combination thereof.

The present invention provides a method of making the compounded composition, including combining the composition including the condensation polyamide and the maleated polyolefin, or the reaction product thereof, with one or more one or more other components to form the compounded polyamide composition.

In various aspects, the method of making the composition including the condensation polyamide and the maleated polyolefin or the reaction product thereof, or the method of making the compounded composition, includes combining the condensation polyamide and the maleated polyolefin before adding a chain extender thereto.

In various aspects, the method of making the composition including the condensation polyamide and the maleated polyolefin or the reaction product thereof, or the method of making the compounded composition, includes providing to a first compounder extruder zone a feed including the condensation polyamide and the maleated polyolefin. The method includes maintaining the first compounder extruder zone conditions sufficient to obtain a first compounded polyamide melt inside the first compounder extruder zone. The method includes introducing a chain extender to the first compounded polyamide melt in a second compounder extruder zone. The method includes maintaining the second compounder extruder zone conditions sufficient to obtain a second compounded polyamide melt inside the second compounder extruder zone, wherein the second compounded polyamide melt is the composition including the condensation polyamide and the maleated polyolefin, the reaction product thereof, or the compounded composition.

In various aspects, the method of making the composition including the condensation polyamide and the maleated polyolefin or the reaction product thereof, or the method of making the compounded composition, includes providing to a first compounder extruder zone a feed including the condensation polyamide and the maleated polyolefin. The method includes maintaining the first compounder extruder zone conditions sufficient to obtain a first compounded polyamide melt inside the first compounder extruder zone. The method includes introducing a chain extender to the first compounded polyamide melt in a second compounder extruder zone. The method includes maintaining the second compounder extruder zone conditions sufficient to obtain a second compounded polyamide melt inside the second compounder extruder zone, wherein the second compounded polyamide melt is the composition including the condensation polyamide and the maleated polyolefin, the reaction product thereof, or the compounded composition. A barrel of a screw extruder includes the first compounder extruder zone and the second compounder extruder zone. The providing of the feed to the first compounder extrusion zone includes providing the feed to a feed inlet of the barrel, the barrel having a length. The chain extender is introduced to the second compounder extruder zone at least 1/4 of the length of the barrel from the feed inlet of the barrel.

In various aspects, the method of making the composition including the condensation polyamide and the maleated polyolefin or the reaction product thereof, or the method of making the compounded composition, includes providing to a first compounder extruder zone a feed including the condensation polyamide and the maleated polyolefin. The method includes maintaining the first compounder extruder zone conditions sufficient to obtain a first compounded polyamide melt inside the first compounder extruder zone. The method includes introducing a chain extender to the first compounded polyamide melt in a second compounder extruder zone. The method includes maintaining the second compounder extruder zone conditions sufficient to obtain a second compounded polyamide melt inside the second compounder extruder zone, wherein the second compounded polyamide melt is the composition including the condensation polyamide and the maleated polyolefin, the reaction product thereof, or the compounded composition. The introducing of the chain extender to the first compounded polyamide melt in the second compounder extruder zone includes introducing the chain extender to the first compounded polyamide melt after at least 50 wt % of the maleated polyolefin fed has incorporated into the condensation polyamide.

The present invention provides a method of extruding a polyamide resin. The method includes providing a polyamide resin including the composition that includes the condensation polyamide and the maleated polyolefin, the reaction product thereof, the compounded polyamide composition, or a combination thereof, to a feed zone of an extruder. The method includes maintaining extruder barrel conditions sufficiently to obtain the polyamide resin melt inside the extruder. The method includes producing extrudate from the extruder while optionally recovering vapor from the extruder via a vacuum draw.

The present invention provides a method of molding a polyamide resin. The method includes providing a polyamide resin including the composition that includes the condensation polyamide and the maleated polyolefin, the reaction product thereof, the compounded polyamide composition, or a combination thereof, to a mold. The method includes producing a molded polyamide resin from the mold.

Through extensive investigation of condensation polyamides, it has been found that unusual properties arise from combinations of certain condensation polyamides (having relatively high amine end group (AEG) numbers (as measured by titration of polymer solution in solvent such as methanol/phenol) together with certain maleated polyolefins, including those polyolefins having a relatively high degree of maleation. In various aspects, the present invention provides a polyamide composition and method of making the same that can produce high quality extruded conduit, such as having superior properties to extruded conduit made from other polyamide compositions, such as increased resistance to glycolysis and high tensile strength. In various aspects, the present invention provides a polyamide composition that can be molded or extruded to produce an article having suitable properties for various end uses such as automotive, electronics, chemical processing, and heat transfer applications, such as having superior properties as compared to molded or extruded articles formed from other polyamide compositions, such as having higher tensile strength, higher chemical resistance, higher stress cracking resistance, or lower melt viscosities. In some aspects, the properties are equal or better than extruded or molded articles formed from HDPE, N11, N12, N612 and PVDF materials.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

The term "conduit" or "conduit structure", as used herein, may refer to a hollow channel or duct suitable for conveying a fluid or passage for laying down and enclosing thin electrical wires and cables. The conduit cross-section may have a single hole or multiple holes depending on the application requirement.

The term "pipe", as used herein, may embody either right-cylindrical geometry, i.e., having circular cross-sectional shape, and other cross-sectional shapes which may be elongated in one axis perpendicular to the conduit long axis, for example, obround and oval cross-sectional shapes.

The term "N6" or "Nylon 6", as used herein, refers to a polymer synthesized by polycondensation of caprolactam. The polymer is also known as polyamide 6, PA6, or poly (caprolactam).

The term "N66" or "nylon-6,6", as used herein, refers to a polymer synthesized by polycondensation of hexamethylenediamine (HMD) and adipic acid. The polymer is also known as Polyamide 66 (or PA66), Nylon 66, nylon 6-6, nylon 6/6 or nylon-6,6.

The term "N12" or "Nylon 12", as used herein, refers to a polymer synthesized by polycondensation of w-aminolauric acid or ring-opening polymerization of laurolactam. The polymer is also known as Polyamide 12 (or PA12), Nylon 12, poly(laurolactam), Poly(dodecano-12-lactam), poly(12-aminododecanoic acid lactam).

The term "N612" or "Nylon 612", as used herein, refers to a polymer synthesized by polycondensation of hexamethylenediamine (HMD) and α,ω-dodecanedioic acid [or C12 diacid]. The polymer is also known as Polyamide 612 (or PA612), PA 6/12, Nylon 6/12.

The term "Nylon 66/6T", as used herein, refers to a co-polymer obtained from N66 and a polymer of N6-terephthalic acid (TPA).

As used herein, "PA610" or "nylon-6,10" is a semi-crystalline polyamide prepared from hexamethylenediamine ($C_6$ diamine, abbreviated as HMD) and decanedioic acid ($C_{10}$ diacid). It is commercially available from Arkema, BASF, and such.

As used herein, "PA66/DI" or "nylon-66/DI" refers to a type of co-polyamide of polyhexamethyleneadipamide (nylon-6,6 or N66 or PA66) and "DI" which is a combination of 2-methyl-pentamethylenediamine (or "MPMD") and isophthalic acid. MPMD is commercially available as INVISTA Dytek® A amine and industrially known as "D" in the abbreviated formulation labeling. Isophthalic acid is commercially available and industrially known as "I" in the abbreviated formulation labeling.

Composition Including a Condensation Polyamide and a Maleated Polyolefin

The present invention provides a composition including a condensation polyamide. The condensation polyamide is at least 30 wt % of the composition. The condensation polyamide is the predominant polyamide in the composition. The composition includes from ≥10 wt % to ≤50 wt % of a maleated polyolefin (e.g., ≥15 wt % to ≤50 wt %). The maleated polyolefin includes maleic anhydride grafted onto a polyolefin backbone. The maleated polyolefin has a grafted maleic anhydride incorporation of ≥0.05 to ≤1.5 wt % based on total weight of the maleated polyolefin.

The maleated polyolefin, or domains thereof, can have a uniform distribution in the condensation polyamide or composition (e.g., uniform molecular distribution of the maleated polyolefin in the condensation polyamide or composition, or uniform distribution of maleated polyolefin domains in the condensation polyamide or composition); the condensation polyamide can have an AEG of ≥65 milliequivalents per kg (meq/kg) and ≤130 meq/kg (e.g., ≥70 meq/kg and ≤125 meq/kg); the condensation polyamide can have an RV of at least 35 (e.g., at least 40, or at least 45); the condensation polyamide can include nylon 66/6T, nylon 66/DI, nylon 66, or a combination thereof; or a combination thereof.

The condensation polyamide can be one or more polyamides that can be formed via condensation (e.g., via reaction of an amine and carboxylic acid group to form an amide and release water). The condensation polyamide can include any suitable one or more condensation polyamides. The condensation polyamide can include nylon 66, nylon 66/6T, nylon 66/DI, or a combination thereof. The condensation polyamide can be nylon 66. The condensation polyamide can be substantially free of polyamides (prior to being combined into the composition and combining with any other polyamides therein) other than one or more of nylon 66, nylon 66/6T, and nylon 66/DI. The condensation polyamide can be nylon 66, and the condensation polymer (prior to being combined into the composition) can be substantially free of polyamides other than nylon 66. The condensation polyamide is the predominant polyamide in the composition, such that the condensation polyamide has a higher concentration in the composition than any other polyamide in the composition. The condensation polyamide can have any suitable relative viscosity (RV), such as determined via a formic acid method (e.g., ASTM D789), such as equal to or greater than 35, 40, or 45, or such as equal to or less than 100, 90, or 80, or such as less than or equal to 100 but equal to or greater than 35, 36, 37, 38, 39, 40, 41, 42, 43, 44, 45, 46, 47, 48, 49, 50, 55, 60, 65, 70, 75, 80, 85, 90, or 95, or such as 30-80, 35-75, or 42-50, or such as 35-100, 40-90, or 45-80. The condensation polyamide can be 30-99.9 wt % of the composition, 30-99.9 wt %, 60-99.9 wt %, or 90-99.9 wt %, or equal to or greater than 30 wt %, 35, 40, 45, 50, 55, 60, 65, 70, 75, 80, 85, 90, 95, 96, 97, 98, 99, or 99.9 wt % of the composition.

The condensation polyamide can have any suitable amount of amine end groups (AEG), such as ≥80 meq/kg and ≤125 meq/kg, ≥80 meq/kg and ≤120 meq/kg, or less than or equal to 125 meq/kg but greater than or equal to 80 meq/kg, 85, 90, 95, 100, 105, 110, 115, or 120 meq/kg.

The composition can further include (in addition to the condensation polyamide) one or more other polyamides, copolymers thereof, or combinations thereof. The one or more other polyamides, copolymers thereof, or combination thereof, can be different than the condensation polyamide (e.g., can be different polyamides having different structures and/or properties than the condensation polyamide). The additional polyamide can be or can include nylon 66, nylon 612, nylon 610, nylon 12, nylon 6, nylon 66/6T, nylon 66/DI, nylon 66/DI, nylon 66/D6, nylon 66/DT, nylon 66/610, nylon 66/612, a polyamide copolymer, or a combination thereof. The one or more additional polyamides can form any suitable proportion of the composition, such as ≥15 to ≤85 wt %, ≥20 to ≤85 wt %, ≥15 to ≤80 wt %, ≥15 to ≤75 wt %, ≥15 to ≤70 wt % of the composition, or less than or equal to 85 wt % but equal to or greater than 15 wt %, 20, 25, 30, 35, 40, 45, 50, 55, 60, 65, 70, 75, or 80 wt %.

The maleated polyolefin includes a polyolefin or polyacrylate backbone having pendant maleic anhydride groups grafted thereto. The polyolefin component can optionally be an ionomer. The polyolefin can be any suitable polyolefin polymer or copolymer. The polyolefin can include EPDM, ethylene-octene, polyethylene, polypropylene, or a combination thereof. In various aspects, the maleated polyolefin is free of EPDM. The maleated polyolefin can have any suitable grafted maleic anhydride incorporation, such as a grafted maleic anhydride incorporation of less than 10 wt %, or of 0.01 to 10 wt %, based on total weight of the maleated polyolefin, such as ≥0.1 to ≤1.4 wt %, ≥0.15 to ≤1.25 wt %, or less than or equal to 1.25 wt % but equal to or greater than 0.1 wt %, 0.2, 0.3, 0.4, 0.5, 0.6, 0.7, 0.8, 0.9, 1, 1.1, 1.2, or 1.3 wt %. The maleated polyolefin can have any suitable glass transition temperature ($T_g$), such as ≥−70° C. to ≤0° C., ≥−60° C. to ≤−20° C., ≥−60° C. to ≤−30° C., or less than or equal to 0° C. but greater than or equal to −70° C., −65, −60, −55, −50, −45, −40, −35, −30, −25, −20, −15, −10, or −5° C. The maleated polyolefin can form any suitable proportion of the composition, such as ≥10 wt % to ≤50 wt %, ≥15 wt % to ≤50 wt %, or less than or equal to 50 wt % but greater than or equal to 10 wt %, 11, 12, 13, 14, 15, 16, 17, 18, 19, 20, 25, 30, 35, 40, 41, 42, 43, 44, 45, 46, 47, 48, or 49%.

The maleated polyolefin can be any suitable maleic anhydride-grafted polyolefin. A variety of maleated polyolefins are commercially available. These may include, but are not limited to, AMPLIFY™ GR Functional Polymers commercially available from Dow Chemical Co. (Amplify™ GR 202, Amplify™ GR 208, Amplify™ GR 216, Amplify™ GR380), Exxelor™ Polymer Resins commercially available from ExxonMobil (Exxelor™ VA 1803, Exxelor™ VA 1840, Exxelor™ VA1202, Exxelor™ PO 1020, Exxelor™ PO 1015), ENGAGE™ 8100 Polyolefin Elastomer commercially available from Dow Elastomer, Bondyram® 7103 Maleic Anhydride-Modified Polyolefin Elastomer commercially available from Ram-On Industries LP, and such. In various embodiments, the maleated polyolefin increases the glycolysis resistance or hydrolysis resistance of the condensation polyamide, improves other properties, or a combination thereof. Table 1 lists non-limiting commercially available modified polyolefins.

TABLE 1

Commercially available modified polyolefins.

| Polyolefin | Commercial Manuf./Trade Name | Modification Level (wt %) in Polyolefin |
|---|---|---|
| Polypropylene | ExxonMobil/Exxelor ™ VA1840 | 0.2-0.5 |
| Polypropylene | Ram-On Industries/Bondyram ® 7103 | <1 |
| Very low-density Polyethylene [vLDPE] | Dow Chemicals/Amplify ™ GR208 | 0.25-0.5 |
| Polypropylene | ExxonMobil/Exxelor ™ PO1015 | 0.25-0.5 |
| Ethylene alpha olefin | ExxonMobil/Exxelor ™ VA1202 | 0.5-1 |
| Ethylene octene | Dow Chemicals/Amplify ™ GR216 | 0.5-1 |
| Pure Ethylene | ExxonMobil/Exxelor ™ VA1803 | 0.5-1 |
| Low-density Polyethylene [LDPE] | Dow Chemicals/Amplify ™ GR202 | >1 |

In Table 1, the term "Modification Level (wt %) in Polyolefin" means the functionalized level in the polyolefin tested. For example, in the first row of Table 1, polypropylene with 0.2-0.5 wt % modification level means it is a modified polyolefin having 0.2-0.5% grafted maleic anhydride content.

In various aspects, the composition can include glass fibers or other glass reinforcements, or the composition can be substantially free of glass fibers or other glass reinforcements. The composition can include ≥1 wt % to ≤50 wt % glass fibers, ≥10 wt % to ≤42 wt %, ≥10 wt % to ≤35 wt %, ≥15 wt % to ≤30 wt %, or less than or equal to 50 wt % but equal to or greater than 5 wt %, 10, 15, 20, 25, 30, 35, 40, or 45 wt %. Disclosed compositions containing glass fiber can lend themselves to mixing, extrusion and molding more easily than would be predicted from the performance of more closely balanced (lower AEG) condensation polyamides.

Reacted Polyamide Composition

The present invention provides a reacted composition that is a reaction product of the composition including the condensation polyamide and the maleated polyolefin. The reacted composition can include a reaction product of the condensation polyamide and the maleated polyolefin, such as a polyamide-polyolefin copolymer formed from at least partial reaction of the condensation polyamide and the maleated polyolefin.

The reacted composition can include the composition including the condensation polyamide and the maleated polyolefin wherein any suitable proportion of the condensation polyamide has reacted with the maleated polyolefin. For example, the reacted composition can include the polyamide-polyolefin copolymer in a concentration range of ≥50 to ≤7500 ppmw, ≥100 to ≤4900 ppmw, ≥225 to ≤3750 ppmw, or less than or equal to 7500 ppmw but greater than or equal to 50, 100, 250, 500, 750, 1,000, 1,500, 2,000, 2,500, 3,000, 3,500, 4,000, 4,500, 5,000, 6,000, 7,000, or 8,000 ppmw. In some aspects, the amount of polyamide-polyolefin copolymer can be calculated by multiplying the concentration of the maleated polyolefin with the modification level of the maleated polyolefin. For example, for a reacted composition made from 80:20 (wt:wt) polyamide:modified polyolefin having 0.5 wt. % grafted (e.g.: maleated) modification, the total reacted polyamide-polyolefin modification functionality in the sample (assuming all grafted maleic anhydride reacts, which may not occur) can be calculated as $(0.20)*(0.005)*10^6=1000$ ppmw.

The reacted composition can include the same components in the same proportions as the composition including the condensation polyamide and the maleated polyolefin, with the exception that the condensation polyamide and the maleated polyolefin are at least partially reacted.

As described herein, without limiting the scope of the disclosure with a recitation of a theoretical mechanism, the generalized chemical reaction schematically represented in Scheme 1 is one approach to understand the interaction of a maleated olefin copolymer with a polyamide.

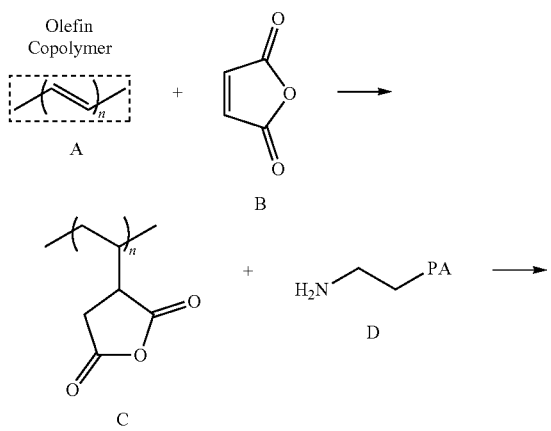

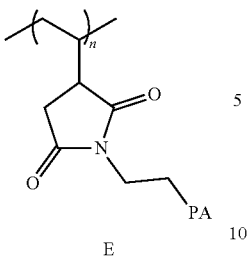

*PA = Polyamide

The term "PA", as used herein, means a polyamide (structure D). Polyamide is a type of synthetic polymer made by the linkage of an amino group of one molecule and a carboxylic acid group of another. Polyamides are also generically referred to as nylons.

For the chemistry disclosed herein and throughout this disclosure; the olefin copolymer (structure A) may be any copolymer of ethylene, propylene, or butylene. The olefin copolymer may contain a suitable degree of maleation, e.g., maleic content, for example, between 0.05 to 1.5% by weight. This material can be referred to as "modified polyolefin" or "maleated polyolefin" (structure C).

The term "reacted Polyamide-Polyolefin copolymer" or "modified polyamide" (structure E), as used herein is the reacted portion of the polyolefin and the polyamide matrix. This is dependent upon the original maleation content of the polyolefin additive (structure C).

The term "degree of maleation" or "modification level", as used interchangeably herein, means the extent of which the olefin copolymer (structure A) has been reacted with maleic anhydride (structure B).

The polyamide-polyolefin copolymer formed from at least partial reaction of the condensation polyamide and the maleated polyolefin is structure E.

Distribution of Maleated Polyolefin, Reaction Product thereof, or Domains thereof, in the Composition The maleated polyolefin, domains thereof, or reaction products thereof with the condensation polyamide, can have any suitable distribution in the condensation polyamide (and in any additional polyamides present) or in the composition. For example, the maleated polyolefin, or domains thereof, can have a uniform or homogeneous distribution in the condensation polyamide (and any additional polyamides present) or in the composition on a molecular level, such that the molecules of the maleated polyolefin are homogeneously distributed therein. The maleated polyolefin or reaction product thereof can forms domains within the condensation polymer (and any other polyamides present) or within the composition; in some aspects, the maleated polyolefin or reaction product thereof can be at least partially immiscible with the condensation polymer. For example, the condensation polymer (and any other polyamides present), or all polymeric components other than the maleated polyolefin, or the remainder of the composition, can form a continuous phase, and the maleated polyolefin can form a discontinuous phase (domains) therein. In various aspects, the compounded polyamide composition described herein can include a uniform or homogeneous distribution of the maleated polyolefin, reaction products thereof, or domains of the maleated polyolefin or reaction products thereof.

In various aspects, extruded materials described herein, formed from the composition that includes the condensation polyamide and the maleated polyolefin, the reaction product thereof, the compounded polyamide composition, or a combination thereof, can include a uniform or homogeneous distribution of the maleated polyolefin, reaction products thereof, or domains of the maleated polyolefin or reaction products thereof.

Compounded Polyamide Composition

The present invention provides a compounded polyamide composition. The compounded polyamide composition includes the composition including the condensation polyamide and the maleated polyolefin and/or a reaction product of the composition. The compounded polyamide composition also includes one or more other components.

The compounded polyamide can be extrudable, such that the compounded polyamide can be extruded to form an extrudate or an extruded article. The compound polyamide can be moldable, such that the polyamide can be placed into a mold and cooled to form a molded article.

The one or more other components can include any suitable one or more components. The one or more other components can include a modified polyphenylene ether, an impact modifier, a flame retardant, a chain extender, a heat stabilizer (e.g., Zytel® additives [DuPont], Irganox® sterically hindered additives [BASF], and such), a colorant additive, a filler, a conductive fiber, glass fibers, another polyamide other than the condensation polyamide, or a combination thereof. Non-limiting examples of optional additives include adhesion promoters, biocides, anti-fogging agents, anti-static agents, anti-oxidants, bonding, blowing and foaming agents, catalysts, dispersants, extenders, smoke suppressants, impact modifiers, initiators, lubricants, nucleants, pigments, colorants and dyes, optical brighteners, plasticizers, processing aids, release agents, silanes, titanates and zirconates, slip agents, anti-blocking agents, stabilizers, stearates, ultraviolet light absorbers, waxes, catalyst deactivators, and combinations thereof.

The one or more other components can include a chain extender. The chain extender can be capable of reacting with the amine and/or acid terminal groups of the condensation polyamide and/or of the reaction product thereof with the maleated polyolefin, thereby connecting two polyamide chains. The chain extender can be any suitable chain extender, such as a dialcohol (e.g., ethylene glycol, propanediol, butanediol, hexanediol, or hydroquinone bis(hydroxyethyl)ether), a bis-epoxide (e.g., bisphenol A diglycidyl ether), polymers having epoxide functional groups (e.g., as pendant and/or terminal functional groups), polymers including anhydride functional groups, bis-N-acyl bis-caprolactams (e.g., isophthaloyl bis-caprolactam (IBS), adipoyl bis-caprolactam (ABC), or terephthaloyl bis-caprolactam (TBC)), diphenyl carbonates, bisoxazolines, oxazolinones, diisocyanates, organic phosphites (triphenyl phosphite, caprolactam phosphite), bis-ketenimines, or dianhydrides. The chain extender can be a polymer including anhydride functional groups, such as a maleic anhydride-polyolefin copolymer (e.g., an alternating copolymer of maleic anhydride and ethylene). For end-uses that require hydrolysis resistance, chain extenders that are known to improve hydrolysis resistance are preferred. The chain extender can be any suitable proportion of the compounded polyamide composition, such as ≥0.05 to ≤5 wt % or ≥0.05 to ≤2 wt % of the compounded polyamide composition, or less than or equal to 5 wt % but greater than or equal to 0.05 wt %, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, or 4.8 wt %.

The compounded polyamide composition can include the condensation polyamide and the maleated polyolefin and/or a reaction product thereof, wherein the maleated polyolefin is ≥10 to ≤50 wt % of the compounded polyamide composition. The compounded polyamide composition can include an additional polyamide (different than the condensation polyamide) that is ≥15 to ≤85 wt %, ≥20 to ≤85 wt %, ≥15 to ≤80 wt %, ≥15 to ≤75 wt %, or ≥15 to ≤70 wt % of the composition, or less than or equal to 85 wt % but equal to or greater than 15 wt %, 20, 25, 30, 35, 40, 45, 50, 55, 60, 65, 70, 75, or 80 wt %, such as nylon 66, nylon 612, nylon 610, nylon 12, nylon 6, nylon 66/6T, nylon 66/DI, nylon 66/D6, nylon 66/DT, nylon 66/610, nylon 66/612, a polyamide copolymer, or a combination thereof. The compounded polyamide composition can include a chain extender that is ≥0.05 to ≤5 wt % of the compounded polyamide composition.

The compounded polyamide composition can include 50-80 wt % of the condensation polyamide and 10-50 wt % of the maleated polyolefin, and/or a reaction product thereof. The compounded polyamide composition can further include 0 to 20 wt % polyamide 612; 0 to 20 wt % modified polyphenylene ether; 0 to 30 wt % flame retardant; 0 to 10 wt % combined chain extender, heat stabilizer and colorant additives; and 0 to 40 wt % combined filler and/or conductive fiber additives.

In various aspects, the compounded polyamide composition can include glass fibers or other glass reinforcements, or the compounded composition can be substantially free of glass fibers or other glass reinforcements. The compounded composition can include ≥1 wt % to ≤50 wt % glass fibers, ≥10 wt % to ≤42 wt %, ≥10 wt % to ≤35 wt %, ≥15 wt % to ≤30 wt %, or less than or equal to 50 wt % but equal to or greater than 5 wt %, 10, 15, 20, 25, 30, 35, 40, or 45 wt %. Disclosed compositions containing glass fiber can lend themselves to mixing, extrusion and molding more easily than would be predicted from the performance of more closely balanced (lower AEG) condensation polyamides.

In various aspects, the composition, reaction product thereof, or compounded polyamide composition, can be provided in a granulate physical form, such as 3 mm diameter 3-5 mm length cylindrical pellets.

In various aspects, the compounded polyamide composition can include 70-80 wt % of a condensation polyamide that is PA66 having an RV of 35-50 and an AEG of ≥65 milliequivalents per kg (meq/kg) and ≤130 meq/kg (e.g., equal to or less than 80 wt % and greater than or equal to 70 wt %, 71, 72, 73, 74, 75, 76, 77, 78, or 79 wt %), and 20-30 wt % of the maleated polyolefin (e.g., less than or equal to 30 wt % and greater than or equal to 20 wt %, 21, 22, 23, 24, 25, 26, 27, 28, 29, or 30 wt %).

In various aspects, the compounded polyamide composition can include 30-50 wt % of a condensation polyamide that is PA66 having an RV of 35-50 and an AEG of ≥65 milliequivalents per kg (meq/kg) and ≤130 meq/kg (e.g., less than or equal to 50 wt % and greater than or equal to 30 wt %, 32, 34, 36, 38, 39, 40, 41, 42, 43, 44, 45, 46, 48, or 49%), 20-40 wt % of an additional polyamide that is PA66/DI (e.g., equal to or less than 40 wt % and greater than or equal to 20 wt %, 22, 24, 26, 28, 30, 32, 34, 36, 38, or 39 wt %), 20-30 wt % of the maleated polyolefin (e.g., less than or equal to 30 wt % and greater than or equal to 20 wt %, 21, 22, 23, 24, 25, 26, 27, 28, 29, or 30 wt %), and 1-10 wt % chain extender (e.g., less than or equal to 10 wt % and greater than or equal to 1 wt %, 2, 3, 4, 5, 6, 7, 8, or 9 wt %).

Table 2 gives examples of component ranges for the compounded polyamide composition, given in parts by weight.

TABLE 2

Examples of component ranges.

| Component (wt. %) | Using PA66 RV Range 35-240 | Using High AEG PA66 RV Range 35-240 | Using PA66/6T Copolymer |
|---|---|---|---|
| Condensation polyamide | 50-75 | 60-80 | 60-80 |
| Polyamide 612 (PA612) | Up to 20 | Up to 20 | Up to 20 |
| Modified PPE | Up to 20 | Up to 20 | Up to 20 |
| Maleated-polyolefinic component (e.g., GR216, Engage 8401, E-43P, and the like) | 18-40 | 18-40 | 18-40 |
| Chain Extender component (e.g., ZeMac, and the like) | Up to 1 | Up to 1 | Up to 1 |
| Colorant component (e.g., BK34, and the like) | Up to 2.5 | Up to 2.5 | Up to 2.5 |
| Heat stabilizer component (e.g., Irganox, Zytel, and the like) | 0.3-2 | 0.3-2 | 0.3-2 |
| Filler component (e.g., GF, and the like) | Up to 25 | Up to 25 | Up to 25 |
| Conductive component (e.g., carbon fiber, carbon black, CNT, graphite powder, and the like) | Up to 15 | Up to 15 | Up to 15 |
| Fire Retardant component | Up to 25 | Up to 25 | Up to 20 |
| TOTAL | 100 | 100 | 100 |

Article

The present invention provides an article that includes the composition including the condensation polyamide and the maleated polyolefin, or the reaction product thereof, or the compounded polyamide composition including one or both of the same.

In various aspects, the article (or the composition, reaction product thereof, or the compounded composition) can be characterized by superior resistance, when compared against a control, to at least one selected from: cold-temperature cracking, urea exposure, fuel exposure, oil exposure, high-temperature exposure, hydrolysis, glycolysis, and salt exposure. In various aspects, the superior properties can be retained after aging, such as greater than or equal to 50% retention of the superior properties after heat aging at 100-200° C., or 130-160° C., or 140° C., or 150° C. The salt can be any suitable salt, such as $ZnCl_2$. The resistance to cold-temperature cracking can include resistance to cracking when cycled from room temperature, such as 20° C., to extreme low temperatures such as −30° C., −40° C., −50° C. or lower. Advantageously, such cold-temperature cracking resistant compositions are suitable for automotive end-uses in extreme environments such as arctic climates. The control can differ by at least one of AEG, weight percentage of maleated polyolefin, and degree of maleation of the maleated polyolefin. The control can have the same composition as the article, the composition, the reaction product thereof, or the compounded composition, except that the polyamide in the control can have an AEG of <60 meq/kg (or <80 meq/kg, or <70 meq/kg). The control can have the same composition as the article, the composition, the reaction product thereof, or the compounded composition, except that the control can be free of the maleated polyolefin, or, for example, can contain less than 0.05 wt % of maleated polyolefin, with the control having the condensation polyamide in place of the maleated polyolefin (e.g., the balance of the control is the condensation polyamide).

The article, the composition, the reaction product thereof, or the compounded composition, can be characterized by superior mechanical strength compared to the control. For example, the article, the composition, the reaction product thereof, or the compounded composition, can have a tensile strength of at least 30 MPa, or 30-200 MPa, or 40-150 MPa, or less than or equal to 200 MPa but greater than or equal to 30 MPa, 40, 50, 60, 70, 80, 90, 100, 110, 120, 130, 140, 150, 160, 170, 180, or 190 MPa.

The article, the composition, the reaction product thereof, or the compounded composition, can have any suitable melt strength, such as a melt strength of at least 0.1 Newton.

The article, the composition, the reaction product thereof, or the compounded composition, can have any suitable Flame Resistance rating, such as a Flame Resistance rating of V-0.

The article, the composition, the reaction product thereof, or the compounded composition, can have any suitable moisture level, such as less than or equal to 0.2 wt %.

The article, the composition, the reaction product thereof, or the compounded composition, can have a tensile strength, measured according to ISO 527 on dry-as-molded specimens, of at least 40 MPa (e.g., 40 MPa, or 40-200 MPa, or 40-150 MPa, or less than or equal to 200 MPa but greater than or equal to 40 MPa, 50, 60, 70, 80, 90, 100, 110, 120, 130, 140, 150, 160, 170, 180, or 190 MPa), and a notched Charpy impact energy, measured at −30° C. and according to ISO 179/1eA on dry-as-molded specimens, of at least 60 kJ/m² (e.g., equal to or greater than 60, 70, 80, 90, or 100 kJ/m²). The "1eA" specifies the sub-method that was used. The sub-method specifies: (a) that the sample was tested edgewise and that the notch was prepare to a specified notch diameter.

The article, the composition, the reaction product thereof, or the compounded composition, can retain ≥50% (e.g., equal to or greater than 50%, 52, 54, 56, 58, 60, 65, 70, 75, 80, 85, 90, 91, 92, 93, 94, 95, 96, 98, or 99%) of the tensile yield strength, tensile elongation at break, and/or tensile break strength after undergoing 1:1 (vol/vol) ethylene glycol:water exposure at 120° C.-130° C. for 1000 hrs. The article, the composition, the reaction product thereof, or the compounded composition, can retain ≥50% (e.g., equal to or greater than 50%, 52, 54, 56, 58, 60, 65, 70, 75, 80, 85, 90, 91, 92, 93, 94, 95, 96, 98, or 99%) of the tensile yield strength, tensile elongation at break, and/or tensile break strength after undergoing 50 wt % aqueous zinc chloride solution exposure at 23° C. for 200 hours under 3% applied strain to the test specimens.

The article, the composition, the reaction product thereof, or the compounded composition, upon heat aging at 140° C. for 1000 hours, can have a tensile yield strength, measured according to ISO 527, of at least 40 MPa, and/or a notched Charpy impact energy, measured at 23° C. and according to ISO 179/1eA of at least 45 kJ/m² (e.g., at least 45, 55, 65, or 75 kJ/m²).

The article, the composition, the reaction product thereof, or the compounded composition, which upon heat aging at 140° C. for 1000 hours has a tensile break strength measured according to ISO 527 of at least 30 MPa (e.g., 30 MPa, or 30-200 MPa, or 30-150 MPa, or less than or equal to 200 MPa but greater than or equal to 30 MPa, 40, 50, 60, 70, 80, 90, 100, 110, 120, 130, 140, 150, 160, 170, 180, or 190 MPa), and/or a tensile elongation at break measured according to ISO 527 of at least 5%.

In various aspects, the article is an extrudate, such as a conduit (e.g., a pipe). In various aspects, the extrudate can be substantially free of glass fibers or other glass reinforcements and/or can be resistant to glycolysis. The conduit can be chosen from rigid, flexible, curved, straight, bent (e.g., 90 degree bend or a bend with another angle), serpentine, partially corrugated, fully corrugated, and a combination thereof. The conduit can have a cross-section chosen from round, oval, oblong, square, rectangle, triangle, star, polygonal, and a combination thereof. The conduit can have any suitable dimensions, such as an outside diameter of 3 mm to 100 mm or 8 mm to 50 mm, and such as a wall thickness of 0.2 mm to 10 mm, or 0.5 mm to 3 mm.

The extruded conduit that is substantially free of glass fibers can be selected from the group consisting of rigid, flexible, curved, bent, serpentine, partially corrugated and fully corrugated. A cross-section of the extruded conduit that is substantially free of glass fibers can be selected from the group consisting of round, oval, oblong, square, rectangle, triangle, star and polygonal. The extruded conduit that is substantially free of glass fibers can be a tube. The extruded conduit that is substantially free of glass fibers can be a pipe.

A conduit (e.g., tube) may embody either right-cylindrical geometry, i.e., having circular cross-sectional shape, and other cross-sectional shapes which may be elongated in one axis perpendicular to the conduit long axis, for example, obround and oval shapes. A tube is characterized by its aspect ratio [L/D], i.e., a geometric ratio of tube length "L" to tube diameter "D". As an illustrative example, a tube having a diameter of 1 cm and 10 cm long will have the Aspect Ratio of 10 [10:1 L/D]. The tube Aspect Ratio can have any range depending on the end-use application. The tube diameter "D" can be specified to be inside tube diameter or outside tube diameter.

In some embodiments, the tube can be straight, curved, bent, serpentine or corrugated along its length. Non-limiting examples of various tube shapes may include short-length and long-length straight tube, angle bent tube [any angle from >0° and <180°], right angle or 90° bent tube, single-curvature or multiple-curvature tube such as a C-shaped, N-shaped, S-shaped, U-shaped, V-shaped, W-shaped, Z-shaped, etc., partially corrugated tube, fully corrugated tube, and other combinations.

The conduit can have any suitable shape and any suitable number of layers. The conduit can have a single layer of material. The conduit can have two (e.g., outer and inner) or three (e.g., outer, middle, and inner) layers, or more than three layers. Also, it is possible to co-extrude multi-layered tubes having non-circular cross-sections (for example, oval, oblong, rectangular, polygonal, etc.), depending on the end-use application and cost of manufacture. Further, the individual layer thicknesses may be varied for the desirable mechanical, structural and burst strength performance.

The industrial utility of the solution presented in this disclosure is apparent in an automotive application as heat exchanging conduit systems. Thin-walled, small-diameter conduits, both straight and corrugated, prepared according to the present disclosure can be effectively assembled for under-the-hood and electric component (e.g.: battery systems) cooling and heat transfer systems. Such conduit systems can be designed and engineered to circulate heat exchange medium (e.g.: water, glycol mixtures, coolants, refrigerants) across the various heat generating components for heat removal in a closed loop manner. Current materials used for such purposes are low-cost EPDM rubber and high-cost PA11/PA12/PA612 specialty polyamides. The EPDM systems are bulky, heavy and require reinforcement wrapping. The specialty polyamides are light-weight and can be flexible but come at a great cost. The present solution addresses the current unmet need in this industrial application space.

Examples of uses for pipes extruded from the composition, reacted composition, and/or compounded polyamide composition can include, but are not limited to, fluid flow lines, gas gathering, water management, oil and liquified NG (LNG) gathering in the oil and gas industry; municipal, industrial, wastewater, potable and irrigation water systems; hydrogen gas industry; electric cable conduits; and other applications where robust and durable piping is desirable.

In various aspects, the article is a molded article. In various aspects, the molded article can include glass fibers (e.g., ≥1 to ≤50% glass fiber, 10 wt. % to 45 wt. %, or 15 wt. % to 42 wt. %) and/or other glass reinforcements and/or can be resistant to cold-temperature cracking.

The compounded glass-fiber reinforced materials of the present disclosure are also suitable for making Injection Molded (IM) parts for applications in the petrochemical and chemical treatment industry. Enhanced structural and cracking resistance performance of such molded parts and articles are particularly suitable for diesel-operated commercial vehicle filter housing applications, wherein impact resistance and toughness under the standard automotive OEMs temperature cycling protocols (for e.g.: −40° C. to ambient temperatures) are desirable. One specific application is a filter housing molded part used in an aqueous urea solution injection system for selective catalytic reduction (SCR) of NOx emissions from a diesel combustion engine.

Flame Retardancy

The article, the composition, the reaction product thereof, or the compounded composition, can have any suitable Flame Resistance rating, such as a Flame Resistance rating of V-0 or V-1. There are a variety of tests and standards that may be used to rate the flame retardant nature of a polymeric resin system. Underwriters' Laboratories Test No. UL 94 serves as one Industry Standard test for flame retardant thermoplastic compounds. "UL 94 Standard for Tests for Flammability of Plastic Materials for Parts in Devices and Appliances" gives details of the testing method and criteria for rating. The test method ASTM D635 is Standard Test Method for Rate of Burning and/or Extent and Time of Burning of Plastics in a Horizontal Position. The test method ASTM D3801 is Standard Test Method for Measuring the Comparative Burning Characteristics of Solid Plastics in a Vertical Position. Vertical burning test ratings (e.g.: V-0, V-1, V-2) are more stringent and difficult to achieve than Horizontal burning ratings (HB-1, HB-2, HB-3). As seen in Table 3, the V-0 rating is distinguished from V-1 and V-2 ratings, which are less acceptable if one is seeking the best flame retardance rating. For certain uses, V-1 is acceptable. Even with the variety of functional additives commercially available, it is not a predictable pathway for a person having ordinary skill in the art to find a particular combination of ingredients which, together, can achieve a V-1 or a V-0 rating in a UL 94 Flammability test.

TABLE 3

V-0, V-1, and V-2 ratings.

| Criteria Conditions | V-0 | V-1 | V-2 |
| --- | --- | --- | --- |
| After-flame time for each individual specimen $t_1$ or $t_2$ | ≤10 s | ≤30 s | ≤30 s |
| Total after-flame time for any condition set ($t_1$ plus $t_2$ for the 5 specimens) | ≤50 s | ≤250 s | ≤250 s |
| After-flame plus afterglow time for each individual specimen after the second flame application ($t_2 + t_3$) | ≤30 s | ≤60 s | ≤60 s |
| After-flame or afterglow of any specimen up to the holding clamp | No | No | No |
| Cotton indicator ignited by flaming particles or drops | No | No | Yes |

The UL 94 Flammability test performance rating may be assessed at various thicknesses, for instance and without limitation, 3.18 mm, 3.0 mm, 1.5 mm, 0.71 mm, 0.4 mm. By achieving a UL 94 V-0 rating at a thickness as thin as 3.18 mm, it is known that a plastic article having any larger thickness will also achieve a UL 94 V-0 rating. Obtaining a V-0 rating is more difficult to achieve in thinner test specimens, such as for 0.4 mm or 0.71 mm thicknesses, than thicker ones.

Other tests and instruments exist to rate flammability, such as but not limited to, the Limiting Oxygen Index (LOI) test (ASTM 2863); the cone calorimetry instrument (which measures amount and rate of heat release during combustion) ASTM E 1354 and ISO 5660-1 Standards are both based upon this instrument; Glow Wire Flammability (IEC 60695-2-12); Glow Wire Ignition (IEC 60695-2-13). Other tests which exist to rate flame retardancy include, and are not limited to, those where the rate of smoke generation, smoke obscuration, the toxicity of smoke and combustion gases, are determined. Other tests exist to rate flame retardancy which are application specific, these include but are not limited to applications such as; apparel fabrics, upholstery fabrics, airbag fabrics, carpets, rugs.

There exist flame retardant additives and flame retardant additive systems well known in the art. There exist broad classes of flame retardant additives and flame retardant additive systems, for instance and without limitation: halogen-containing flame retardants, halogen-containing flame retardants with synergists, phosphorus-containing flame retardants, inorganic flame retardants, nitrogen-containing flame retardants, nitrogen-containing flame retardants with synergists, these may be used alone or in combination. Plastics Additive Handbook, 5$^{th}$ Ed., Ed Hans Zweifel, Hanser, 2000, ISBN 1-56990-295-X, Chapter 12 speaks to the general topic and in Table 12.1 p 688 exemplifies typical flame retardant additive system and the levels of flame retardant additives used in polyamides. Plastic Additives, 4th Ed., ed R Gächter and H Müller, Hanser, 1993, ISBN 3-446-17571-7, Chapter 12 speaks to the general topic and in Table 7 p 739 exemplifies flame retardant additives and the levels of flame retardant additives used in polyamides. Flame Retardants for Plastics and Textiles Practical Applications, Ed Edward D. Weil, Sergei V. Levchik. 2nd Edition, Hanser 2016, ISBN: 978-1-56990-578-4,Chapter 5, p 117 speaks to the topic of flame retardant additives and flame retardant additive systems for polyamides and exemplifies flame retardant additives and the levels of flame retardant additives used in polyamides throughout. Manufacturers and providers of flame retardant additives will often supply guidance on effective formulations, for instance, ICL Industrial Products Ltd produce such a guidance sheet for polyamides: Flame Retardants for Polyamides (General Application Data on Flame-Retardants for Polyamides 6 and 6,6), historically available at http://icl-ip.com/wp-content/uploads/2012/02/Polyamide-gnl-130729.pdf.

Halogen-containing flame retardant additives include, but not limited to: brominated polystyrene; poly(dibromostyrene); poly(pentabromobenzylacrylate); brominated polyacrylate; brominated epoxy polymer; epoxy polymers derived from tetrabromobisphenol A and epichlorohydrin; ethylene-1,2-bis(pentabromophenyl); Dechlorane Plus; chlorinated polyethylene; and mixtures thereof. Halogen-containing flame retardant additives with synergists include, but are not limited to: the halogen-containing flame retardant additive together with a synergist, such as but not limited to: antimony (III) oxide, antimony (V) oxide, sodium antimonate; iron (II) oxide, iron (II/III) oxide, iron (III) oxide, zinc borate, zinc phosphate, zinc stannate, and mixtures thereof. Phosphorus-containing flame retardant additives include, but are not limited to: red phosphorus, ammonium polyphosphate, melamine polyphosphate, melamine pyrophosphate, metal dialkylphosphinates (such as but not limited to aluminum methylethylphosphinate, and aluminum diethylphosphinate), aluminum hypophosphite, and mixtures thereof. Inorganic flame retardant additives include, but are not limited to: magnesium hydroxide, alumina monohydrate, alumina trihydrate, aluminum hydroxide, and mixtures thereof. Nitrogen-containing flame retardant additives include, but not limited to: melamine cyanurate, melamine polyphosphate, melamine pyrophosphate, melamine, melan, and mixtures thereof. Nitrogen-containing flame retardant additives with synergists include, but not limited to: nitrogen-containing flame retardant additives together with a synergist, such as but not limited to, Novalac resins. Small amounts of polytetrafluoroethylene are often incorporated into a flame retardant additive system to retard dripping.

The literature of flame retardant additive systems also speaks to the different mechanisms by which the flame retardant additive imparts its flame retardant properties which may be active in the condensed phase, the gas phase or both. In the condensed phase the flame retardant additive may act as a heat sink or may participate in the formation of char (called an intumescent system) limiting heat and mass transportation, or provide conduction of heat away by evaporation, or mass dilution. In the gas phase flame retardants may act by interrupting the combustion chemistry by providing volatile species that form radicals in the gas phase which quench the radical chain reactions that would otherwise initiate or propagate the fire. Without limiting the scope of the disclosed subject matter, the composition, reacted composition, compounded polyamide composition, or article formed therefrom, may aid the effectiveness by which these flame retardant mechanisms may work.

Method of Making a Polyamide Composition

The present invention provides a method of making the composition including the condensation polyamide and the maleated polyolefin, or the reaction product thereof, or the compounded polyamide composition including one or both of the same. The method can include combining the condensation polyamide and the maleated polyolefin to form the composition, the reacted composition, the compounded composition, or a combination thereof. A method of forming the article can include making the composition, reaction product thereof, or compounded polyamide composition; alternatively, the composition, reaction product thereof, or compounded polyamide composition can be pre-formed before the onset of a method of forming the article.

The present invention provides a method of making the compounded composition, including combining the composition including the condensation polyamide and the maleated polyolefin, or the reaction product thereof, with one or more one or more other components to form the compounded polyamide composition.

The method of making the composition including the condensation polyamide and the maleated polyolefin or the reaction product thereof, or the method of making the compounded composition, can be a method of improving glycolysis resistance of the condensation polyamide, wherein the composition, reaction product thereof, or compounded composition including one or both of the same, has greater glycolysis resistance than the condensation polyamide.

In various aspects, the method of making the composition including the condensation polyamide and the maleated polyolefin or the reaction product thereof, or the method of making the compounded composition, can include combining the condensation polyamide and the maleated polyolefin, or compounding the composition or reaction product thereof, in the absence of added glass fibers.

In various aspects, the method of making the composition including the condensation polyamide and the maleated polyolefin or the reaction product thereof, or the method of making the compounded composition, includes combining the condensation polyamide and the maleated polyolefin (e.g., and allowing the two to at least partially react to form a reaction product thereof) before adding a chain extender thereto. In other aspects, the method of making the composition including the condensation polyamide and the maleated polyolefin or the reaction product thereof, or the method of making the compounded composition, includes combining the condensation polyamide, the maleated polyolein, and the chain extender at once without allowing any extra time for the condensation polyamide and the maleated polyolefin to react.

In various aspects, the method of making the composition including the condensation polyamide and the maleated polyolefin or the reaction product thereof, or the method of making the compounded composition, includes providing to a first compounder extruder zone a feed including the condensation polyamide and the maleated polyolefin. The method includes maintaining the first compounder extruder zone conditions sufficient to obtain a first compounded polyamide melt inside the first compounder extruder zone. The method includes introducing a chain extender to the first compounded polyamide melt in a second compounder extruder zone. The method includes maintaining the second compounder extruder zone conditions sufficient to obtain a second compounded polyamide melt inside the second compounder extruder zone, wherein the second compounded polyamide melt is the composition including the condensation polyamide and the maleated polyolefin, the reaction product thereof, or the compounded composition. The second compounder extruder zone is downstream of the first compounder extruder zone and can be any suitable distance from the first compounder extruder zone; the chain extender can be added at any suitable location along the length of the screw extruder barrel.

The first compounder extruder zone can be substantially free of the chain extender, and/or of any chain extender. The chain extender can be ≥0.05 to ≤5 wt % of the second compounded polyamide melt. The method can further include producing an article from the second compounded polyamide melt; for example, the method can include producing extrudate from the second compounded polyamide melt, or producing a molded article from the second compounded polyamide melt.

The extruder used to make the composition including the condensation polyamide and the maleated polyolefin or the reaction product thereof, or the method of making the compounded composition, can be a screw extruder (e.g., a single screw extruder, a vented twin-screw extruder, or an unvented twin-screw extruder). A barrel of the screw extruder can include the first compounder extruder zone and the second compounder extruder zone. Providing the feed to the first compounder extrusion zone can include providing the feed to a feed inlet of the barrel.

In various aspects, the chain extender can be introduced to the second compounder extruder zone in the barrel a suitable distance away from the feed inlet. For example, the chain extender can be introduced to the second compounder extruder zone at least ¼ of the length of the barrel from the feed inlet of the barrel. The chain extender can be introduced to the second compounder extruder zone at least ½ of the length of the barrel from the feed inlet of the barrel. The chain extender can be introduced to the second compounder extruder zone at least ¾ of the length of the barrel from the feed inlet of the barrel. The chain extender can be introduced to the second compounder extruder zone sufficiently far from an outlet of the barrel to provide mixing of the chain extender with the first compounded polyamide melt to form the second compounded polyamide melt, and equal to or greater than ¼ of the length of the barrel from the feed inlet of the barrel, or ½, ¾, or more. The chain extender can be introduced to the second compounder extruder zone sufficiently far from an outlet of the barrel to provide mixing of the chain extender with the first compounded polyamide melt to form the second compounded polyamide melt, and equal to or greater than 20% of the length of the barrel from the feed inlet of the barrel, or 30%, 40, 50, 60, 70, 80, 90, or 95% or more of the length of the barrel from the feed inlet of the barrel.

In various aspects, the introducing of the chain extender to the first compounded polyamide melt in the second compounder extruder zone can include introducing the chain extender to the first compounded polyamide melt after a certain weight percentage of the maleated polyolefin has incorporated into the condensation polyamide or into the composition. Incorporation into the condensation polyamide or into the composition can include homogeneous blending of the chain extender with the condensation polyamide or the composition (e.g., on a molecular level, or of domains of the maleated polyolefin or a reaction product thereof), formation of a reaction product of the maleated polyolefin (e.g., with the condensation polyamide), formation of domains of the maleated polyolefin or a reaction product thereof in the condensation polyamide or the composition, or a combination thereof. The introducing of the chain extender to the first compounded polyamide melt in the second compounder extruder zone can include introducing the chain extender to the first compounded polyamide melt after at least 50 wt % of the maleated polyolefin fed has incorporated into the condensation polyamide, or greater than or equal to 50%, 60%, 70%, 80%, 90%, greater than or equal to 95%, or after about 100% of the maleated polyolefin has incorporated into the condensation polyamide.

Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using the composition, reacted composition, and/or compounded polyamide composition of the present disclosure, such as from the second compounded polyamide melt.

Method of Extrusion of a Polyamide Resin

The present invention provides a method of extruding a polyamide resin (e.g., a method of forming an extruded article). The method includes providing a polyamide resin including the composition that includes the condensation polyamide and the maleated polyolefin, the reaction product thereof, the compounded polyamide composition, or a combination thereof, to a feed zone of an extruder. The method includes maintaining extruder barrel conditions sufficiently to obtain the polyamide resin melt inside the extruder. The method includes producing extrudate (e.g., a conduit) from the extruder while optionally recovering vapor from the extruder via a vacuum draw.

In some aspects, compounded polyamide resin pellets can be added to an extrusion apparatus and the polyamide resin can be melted.

Various methods and apparatuses for extruding thermoplastic resins into conduits or tubes of desired shapes and forms can be used for production of tubes of the disclosed invention. For example, in one embodiment, melting may be done in an extruder with single screw or twin-screw to produce a homogeneous melt. Tube head temperature can be maintained within 280-300° C. of the melt temperature of polymer. The extrudate can be cooled in air or using coolant. For coolant method, a calibrator with a coolant, such as water in the temperature range of 40-70° C., can also be used. The flow rate of water in the cooling tank is maintained such that outside skin freezes instantaneously upon contact, and the outside tube temperature is within 5-10° C. of the glass transition temperature of polymer.

In one embodiment, the extrusion apparatus includes a static mixer and a rotating screw design configured to melt the polyamide containing thermoplastic resin. In alternative embodiments, a single screw extruder, a twin-screw extruder, a vented single screw extruder, or a vented twin screw extruder is used.

Use of the static mixer in the process of the present invention was found to significantly improve the surface quality of the inside surface of the tube. When a static mixer was used in the process, the inside surface of the tube was observed to have a glossy finish. Other advantages of using a static mixer include thermal homogenization, minimization of melt memory, uniform viscosity and density, enhanced mixing of colors and minor additives, efficient use of all raw materials, elimination of streaks or clouds in the pipe, consistent quality and higher yield (less rejects).

In one embodiment, the polyamide thermoplastic resin can be melted at temperature ranging from 240 to 320° C., or from 250 to 310° C.

The melted polyamide thermoplastic resin is then extruded and passed through a tube forming zone of the extrusion apparatus to form the thermoplastic tube. Positive pressure may be applied to the internal cavity of the formed tube through mandrel or pin. In one aspect of this embodiment, the process further includes the step of passing the portion of a thermoplastic tube through a dryer.

In one embodiment of this process of the present invention, the residence time from extrusion to tube forming is less than 60 minutes, for example, less than 50 minutes, for example, less than 40 minutes. Examples of tube forming zones include, but are not limited to, spiral or basket shaped die head, transition zone, a heated mandrel with or without a heated pin which forms at least a portion of a thermoplastic tube. When using a heated mandrel or pin, positive pressure may be applied to the internal cavity of the formed tube through mandrel or pin.

In one embodiment, the process of the present invention further includes passing the melted polyamide thermoplastic resin through a screen to remove any contaminants or un-melted portions prior to extrusion. In this embodiment, the screen may be reinforced by a breaker plate to create pressure in the extruding apparatus.

An extruded conduit can be a multi-layer conduit including one or more layers formed from the composition that includes the condensation polyamide and the maleated polyolefin, the reaction product thereof, the compounded polyamide composition, or a combination thereof, or a monolayer conduit formed from the composition. Monolayer conduits can optionally include up to 2 wt % (actives) UV-grade colorant. Multi-layered conduits can include inside/outside surface skin layers and can include up to 1 wt % (actives) non-UV grade colorant. The extruded conduit the article can be characterized, when compared against a control, by superior resistance to at least one selected from cold-temperature cracking, urea exposure, fuel exposure, oil exposure, high-temperature exposure, hydrolysis, glycolysis, and salt exposure.

Method of Molding of a Polyamide Resin

The present invention provides a method of molding a polyamide resin (e.g., a method of forming a molded article). The method includes providing a polyamide resin including the composition that includes the condensation polyamide and the maleated polyolefin, the reaction product thereof, the compounded polyamide composition, or a combination thereof, to a mold. The method includes producing a molded polyamide resin from the mold.

EXAMPLES

Various embodiments of the present invention can be better understood by reference to the following Examples which are offered by way of illustration. The present invention is not limited to the Examples given herein.

General Procedure for Producing Compounded Material

A twin-screw vented extruder having 18-mm diameter co-rotating screw with a 40-56 L/D (i.e., L/D ratio of 40-56) was used for compounding. The unit had one main feeder and at least three side feeders. A feed rate of at least 1 kg/hr was used. The twin-screw co-rotating/turning at least 1000 RPM was sufficient to provide high shear for effective compounding. The total compounder throughput was at least 15 kg/hr.

The compounding unit had at least three vent ports: one atmospheric port and two vacuum ports. A knock-out pot was provided in this operation. The rotating twin screws imparted forward momentum to the heated mass inside the barrel. The barrel was heated along its length to melt the polymer. Typically, 240-320° C. was used for nylon 66.

The processing section of the twin-screw compounder was set up to suit various process needs and to allow a wide variety of processes, such as compounding processes. Polymer, fillers, and additives (as desired), were continuously fed into the first barrel section of the twin screw using a metering feeder. The products were conveyed along the screw and were melted and mixed by kneading elements in the plastification section of the barrel. The polymer then traveled along to a side port where fillers (if desired), such as but not limited to glass fiber, could be added. The polymer then traveled on to degassing zones and from there to a pressure build zone where it then exited the die via an at least 3-mm hole as a lace. The cast lace was fed into a water bath to cool and to enable it to be cut into chips via a pelletizer. The unit was able to withstand at least 70 bar die pressure. A die with a minimum of four holes, each at least 3 mm diameter, was used for pelletizing.

The compounded pellet having a diameter of 3 mm and a length of 3-5 mm was produced using the above equipment. The moisture content of the pelletized material was <0.2 wt. %.

Flammability testing was established by performing a test functionally equivalent to the UL 94 Standard.

General Procedure for Volatile Extraction Method. Extrusion Step

The compounded polyamide resin pellets were added to an extrusion apparatus and the polyamide resin was melted.

Various methods and apparatuses for extruding thermoplastic resins into conduits or tubes of desired shapes and forms were used for production of tubes. Melting was done in a vented twin-screw extruder in 26 mm or 45 mm sizes to produce a homogeneous melt. Tube head temperature was maintained within 280-300° C. of the melt temperature of polymer. The extrudate was cooled in air or using coolant. For coolant method, a calibrator with a coolant, such as water in the temperature range of 40-70° C., was also used. The flow rate of water in the cooling tank was maintained such that outside skin freezes instantaneously upon contact, and the outside tube temperature was within 5-10° C. of the glass transition temperature of polymer.

The extrusion apparatus included a static mixer and a rotating screw design configured to melt the polyamide-containing thermoplastic resin, generally at a temperature between 260 and 310° C. Use of the static mixer in the was found to significantly improve the surface quality of the inside surface of the tube. When a static mixer was used in the process, the inside surface of the tube was observed to have a glossy finish. Other advantages of using a static mixer included thermal homogenization, minimization of melt memory, uniform viscosity and density, enhanced mixing of colors and minor additives, efficient use of all raw materials, elimination of streaks or clouds in the pipe, consistent quality, and higher yield (e.g., less rejects).

The melted polyamide containing thermoplastic resin was then extruded and passed through a tube forming zone of the extrusion apparatus to form the thermoplastic tube. Positive pressure was applied to the internal cavity of the formed tube through mandrel or pin. In one aspect of this embodiment, the process further includes the step of passing the portion of a thermoplastic tube through a dryer.

Materials Used in Examples

Feedstock PA66 polyamide, as used herein, is a commercially available INVISTA nylon 66 (or N66) grade under the Tradename INVISTA™ U4800 polyamide resin. The PA66 has standard RV range of 42-50. The feedstock PA66 may also have RV ranging from 80 to 240.

As used herein, "High-AEG polyamide 66" or "High AEG N66" is commercially available from INVISTA. High-AEG polyamide 66 is characterized by its RV range of 30-80, for example 35-75 RV, for example, 35-70 RV, and AEG of ≥65 milliequivalents per kg (meq/kg) and ≤130 meq/kg of the polyamide resin, for example ≥70 meq/kg and ≤125 meq/kg, ≥75 meq/kg and ≤125 meq/kg, ≥80 meq/kg and ≤125 meq/kg, ≥90 meq/kg and ≤120 meq/kg of the polyamide resin.

As used herein, "PA 66/6T" refers to a type of partially aromatic polyamide that is commercially available from manufacturers including Arkema, BASF, DuPont, DSM and EMS. PA 66/6T is a type of co-polyamide prepared from PA66 and "6T". The 6T part is a combination of hexamethylene diamine and terephthalic acid "T".

As used herein, "PPE" is commercially available from Asahi Kasei, SABIC, Mitsubishi and LG Chem.

As used herein, "Amplify® GR216" is a maleic anhydride grafted and is commercially available from Dow Chemical.

As used herein, "PA612" is commercially available from DuPont, EMS, Shakespeare, Nexis. PA612 is a semi-crystalline polyamide prepared from hexamethylenediamine (C6 diamine, abbreviated as HMD) and dodecanedioic acid ($C_{12}$ diacid, abbreviated as DDDA).

As used herein, "Engage 8401" is commercially available from Dow Chemical.

As used herein, "Epolene E-43P" is commercially available from Westlake Chemical.

As used herein, "ZeMac E60" is a chain extender that is a copolymer of maleic anhydride and ethylene and is commercially available from Vertellus.

As used herein, "BK34" is a colorant additive and is commercially available from AmeriChem, Clariant.

As used herein, "Zytel FE7108" is commercially available from DuPont, AmeriChem.

Diethylphosphinic Acid Aluminum salt (CAS No. 225789-38-8) belongs to a family of dialkyl phosphinic acid salts. It is commercially available for use as flame retardant in engineering plastics such as polyamides, polyesters, thermosets and elastomers.

As used herein, Rianox® U-Pack B1171, a commercial polymer additive product of Rianlon, is a blend of hindered phenolic antioxidant and a phosphite for processing and long-term thermal stabilization.

The formulation "PA66/DI" used in the examples of the present disclosure had an RV of 45, and a composition of 92:8 PA66:DI (wt/wt), with the "DI" part being about 40:60 D:I (wt/wt). Other non-limiting co-polyamides suitable for use in place of the PA66/DI used in the present examples include 66/D6, 66/DT, 6T/DT, 66/610, 66/612, and such.

As used herein, "Stabaxol® P100" is a type of hydrolysis stabilizer commercially available from Lanxess.

Test Methods Used in the Examples

ASTM D789: Relative viscosity (RV) measurement method. ASTM D638-14: Tensile strength (MPa) measurement method. ISO 75: Heat Deflection Temperature [HDT] measurement method. ISO 178: Flexural Stress and Flexural Modulus measurement method. ISO 180: Izod Notched Impact Strength (23° C., kJ/m2) measurement method. ISO 188: Method of heat aging used for test samples. ISO 307: Viscosity Number (VN) method using sulfuric acid. ISO 527: Tensile Modulus and % Elongation-at-Break measurement method. UL 94 Std.: Flammability [V-0/V-1/V-2] Rating Determination method. ISO 179/2-1eU: Notched and Un-Notched Charpy Impact. ISO 11357: Melting point via DSC.

Zinc Chloride (Salt) Exposure

To simulate Environmental Stress Cracking (ESC), injection molded tensile bars were placed onto multiple sustained strain fixtures, with strain rates of 0%, 1% and 3%. Four samples were tested per exposure and strain conditions. The exposure medium was 50% zinc chloride aqueous solution. Exposure temperature and time were 23° C. and 200 hours, respectively. The resistance to $ZnCl_2$ testing was performed according to the standard SAE J2260 (1996) Section 7.5. The strained tensile bars were examined for crazing after 24 hours, 72 hours, 120 hours, 168 hours, and 200 hours of exposure time. During this period, pH of the zinc chloride solution was monitored and adjusted if needed to achieve a constant pH. At the completion of exposure time, the tensile stress and elongation at break were measured via ASTM D638 or ISO 527 at 23° C.

Glycol/Water Exposure

Injection molded tensile and impact bars were used for testing. A mixture of glycol/water at 1:1 volume ratio was prepared and cast into a pressure vessel. Then, the bars were fully immersed in the glycol/water mixture and the pressure vessel was sealed. Pressure and temperature were both slowly increased to achieve the desired level. The exposure temperature and time were 100-130° C. and 1000-3000 hours, respectively. Test bars were removed for tensile and impact testing at the interval of 500 hours.

Hot Air Aging

Injection molded tensile and impact bars were used for testing. Bars were heat-aged according to ISO 188. After heat-aging, the bars were cooled to room temperature in the lab, and tensile stress, elongation at break, and impact properties were measured using the appropriate methods listed above.

Examples 1(A-M). Compounding of PA Resins

Tables 4A and 4B give compositional ranges for the several polyamide samples that were compounded using the general procedure detailed above.

TABLE 4A

Polyamide samples 1A-1H.

| Component | A wt. % | B wt. % | C wt. % | D wt. % | E wt. % | F wt. % | G wt. % | H wt. % |
|---|---|---|---|---|---|---|---|---|
| 48 RV PA66 (U4800) | 73.5 | 73.5 | 70.5 | 73 | 58.5 | | | 58.5 |
| High AEG PA66 (45 RV) | | | | | | 73.5 | | |
| PA 66/6T Copolymer | | | | | | | 73.5 | |
| Modified PPE | | | | | | | | 15 |
| Maleated Polyolefin (Amplify™ GR216 or ExxonMobil VA1840) | 25 | 20 | 25 | 25 | 25 | 25 | 25 | 25 |
| PA612 | | | | | 15 | | | |
| Engage 8401 | | 5 | | | | | | |
| Epolene E-43P | | | 3 | | | | | |
| Chain Extender (ZeMac E60) | | | | 0.5 | | | | |
| Colorant (BK34 CB&N) | 0.6 | 0.6 | 0.6 | 0.6 | 0.6 | 0.6 | 0.6 | 0.6 |
| Irganox B1171 HS Zytel FE7108 | 0.9 | 0.9 | 0.9 | 0.9 | 0.9 | 0.9 | 0.9 | 0.9 |
| TOTAL | 100 | 100 | 100 | 100 | 100 | 100 | 100 | 100 |

TABLE 4B

Samples 1I-1M.

| Component | I wt. % | J wt. % | K wt. % | L wt. % | M wt. % |
|---|---|---|---|---|---|
| 48 RV PA66 (U4800) | 52 | | | 47 | 37 |
| High AEG PA66 (45 RV) | | 52 | | | |
| PA 66/6T Copolymer | | | 59 | | |
| Modified PPE | | | | 15 | |
| Maleated polyolefin (Amplify™ GR216 or ExxonMobil VA1840) | 25 | 25 | 25 | 25 | 25 |
| PA612 | | | | | 15 |
| Diethylphosphinic Acid Aluminum salt | 22 | 22 | 15 | 12 | 22 |
| Rianox® U-Pack B1171 | 0.4 | 0.4 | 0.4 | 0.4 | 0.4 |
| Colorant (e.g., BK34 (CB&N)) Zytel FE7108 | 0.6 | 0.6 | 0.6 | 0.6 | 0.6 |
| TOTAL | 100 | 100 | 100 | 100 | 100 |

The compounded polyamide specimens A through M in Tables 4A-B were obtained as cylindrical pellets of dimension 3 mm diameter and 3-5 mm length.

Example 2. Extrusion of Compounded Resin in Conduit Shape

A conduit was extruded from melted compounded polyamide resins of Examples 1(A-M) using a vented twin-screw extruder. The molten polymer was passed through a screen into a heated spiral or basket-type die head where the polymer came in contact with a mandrel. The melted polymer then flowed into the gap between the pin of the mandrel and the sleeve, referred to as the die-gap, where the polymer was cooled down. The conduit wall thickness was controlled by the die-gap, swell ratio, and orientation ratio. Typical extrusion conditions are as follows: Screw RPM 40-200; Grooved bush temp 40-200° F.; Barrel Temps. (5 barrels) 505-580° F.; Die Temp. (5 die heads) 500-550° F.

Once the compounded resin composition was passed through the die-gap, it was then passed through a calibrator ring, which was used to size the conduit to the correct outer diameter. Water may or may not be used in the calibrator ring as a lubricant to minimize sticking. The calibrator ring also has the ability to pull a vacuum for correctly sizing the outer diameter of the conduit. The conduit was then moved through two or more cooling tanks with either water spray of atomized droplets or a water bath to cool the conduit to less than 150° C. The extruded conduit (or tube) used in most Examples herein has standard Aspect Ratio (L/D) of between 5 and 100 with 0.8-5 cm outside diameter and wall thickness in the range of up to 3 mm. The extruded conduit (tube) was produced in a continuous fashion to either make continuous coils or cut into straight section of desired length using a saw. However, the same or similar conditions can be utilized to manufacture bigger or smaller tube sizes with standard L/D ranging from 5 to 1000.

Using the extrusion process described above, Examples A-H compounded resins were extruded in the form of a cylindrical conduit of dimension 8-50 mm outside diameter x variable linear length, with a wall thickness in the range 0.5-3 mm.

The extruded cylindrical conduits included straight and corrugated designs. These conduit specimens were tested for flexibility, mechanical strength, chemical resistance (particularly, salt resistance), glycolysis resistance, hydrolysis resistance, heat aging, and flame resistance.

The extruded conduits according to the present Example showed improved performance with respect to their mechanical strength, chemical resistance ($ZnCl_2$ salt resistance), glycolysis resistance, hydrolysis resistance, heat aging, and flame resistance.

Surprisingly, the extruded conduits according to the present Example showed improved flexibility without causing any stress cracking for a long in-use duration.

Example 3. Mechanical and Structural Strength

In Table 5A, the mechanical and structural performance properties are listed for several of the test specimens prepared according to the Example 1 formulations.

TABLE 5A

Mechanical and structural performance properties for test specimens from Example 1 formulations.

| Performance Property | Example 1A | Example 1E | Example 1F |
|---|---|---|---|
| Moisture Absorption, at 50% RH (%) | 2.1 | 1.9 | 2.2 |
| Tensile Strength, DAM (MPa) | 47 | 43 | 46 |
| Tensile Strength, at 50% RH (MPa) | 45 | 41 | 44 |
| Elongation @ Break, DAM (%) | 122 | 128 | 149 |
| Elongation @ Break, at 50% RH (%) | 207 | 203 | 225 |
| 23° C. Notched Charpy Impact, DAM (kJ/m$^2$) | 102 | 101 | 107 |

TABLE 5A-continued

Mechanical and structural performance properties
for test specimens from Example 1 formulations.

| Performance Property | Example 1A | Example 1E | Example 1F |
|---|---|---|---|
| 23° C. Notched Charpy Impact, at 50% RH (kJ/m$^2$) | 130 | 128 | 132 |
| −30° C. Notched Charpy Impact, DAM (kJ/m$^2$) | 47 | 61 | 90 |
| −30° C. Notched Charpy Impact, at 50% RH (kJ/m$^2$) | 71 | 67 | 85 |
| 23° C. Un-Notched Charpy Impact, DAM | NB | NB | NB |
| −30° C. Un-Notched Charpy Impact, DAM | NB | NB | NB |
| Flexural Modulus, DAM (MPa) | 1530 | 1500 | 1430 |
| Melt Temperature (° C.) | 262 | 255 | 262 |

RH—Relative Humidity;
DAM—Dry as Molded;
NB—No Break

In Table 5B, the mechanical and structural performance properties are listed for several of the commercially available PA66, PA12 and PA612 materials.

TABLE 5B

Mechanical and structural performance properties for several
commercially available PA66, PA12, and PA612 materials.

| Performance Property | Commercial High Tough PA66 | Commercial PA12 (Extrusion Grade) | Commercial PA612 (Extrusion Grade) |
|---|---|---|---|
| Moisture Absorption, at 50% RH (%) | 2.0 | 0.6 | 1.2 |
| Tensile Strength, DAM (MPa) | 50 | 41 | 54 |
| Tensile Strength, COND (MPa) | 46 | 39 | 41 |
| Elongation @ Break, DAM (%) | 45 | 163 | 20 |
| Elongation @ Break, COND (%) | 218 | 171 | 76 |
| 23° C. Notched Charpy Impact, DAM (kJ/m$^2$) | 72 | 88 | 43 |
| 23° C. Notched Charpy Impact, COND (kJ/m$^2$) | 122 | 100 | 96 |
| −30° C. Notched Charpy Impact, DAM (kJ/m$^2$) | 33 | 87 | 15 |
| −30° C. Notched Charpy Impact, COND (kJ/m$^2$) | 38 | 92 | 21 |
| 23° C. Un-Notched Charpy Impact, DAM/COND | NB/NB | NB/NB | NB/NB |
| −30° C. Un-Notched Charpy Impact, DAM/COND | NB/NB | NB/NB | NB/NB |
| Tensile Modulus, DAM (MPa) | 1776 | 960 | 1970 |
| Tensile Modulus, COND (MPa) | 612 | 542 | 1158 |
| Flexural Modulus, DAM (MPa) | 1500 | — | — |
| Melt Temperature (° C.) | 260-263 | 180 | 220 |

RH—Relative Humidity;
DAM—Dry as Molded;
COND—Conditioned specimen at 50% RH;
NB—No Break The inventive test specimens according to the present Example have the following properties: Tensile strength >40 MPa (DAM) and >30 MPa (at 50% RH). Elongation @ Break >100% (DAM) and >200% (at 50% RH). Notched Charpy Impact @ 23° C. >100 kJ/m$^2$ and @ −30° C. >20 kJ/m$^2$. Un-Notched Charpy Impact @ 23° C. and @ −30° C. "No Break". Moisture uptake <2.5% at 50% RH conditioned specimens. Low water vapor permeation of <30 mg/h/m$^2$. Low conductivity of >10$^{12}$ Ohm.cm. Extruded or molded articles sustain 1.5-2.5 bars (5 bars maximum) operating pressure. Chemical exposure or aging performance: Retained ≥50% mechanical properties after 50:50 (vol/vol) glycol:water exposure at 100° C. for 2000 hours or at 130° C. for 1000 hours; Retained ≥50% mechanical properties after 50% zinc chloride solution exposure at 23° C. for 200 hours; Retained ≥50% mechanical properties after heat aging at 110° C. or 140° C. for 1000 hours.

Example 4. Salt Resistance Testing

Some of the test bar specimens prepared from the Example 1 formulations, were exposed to 50% aqueous zinc chloride (ZnCl$_2$) solution. The exposure time was 200 hours at 23° C. and under 3% sustained strain to simulate the tube bending condition. The salt resistance test was performed according to the SAE J2260 (1996) Test Method Section 7.5.

Table 6 provides the measured Break Strength (in MPa), Tensile Elongation of Break (%), and Tensile Modulus (in MPa) for the tested specimens exposed to salt solution at 23° C. and under 3% strain. The test results labeled "Before" are for test specimens that were not exposed to the salt solution. The test results labeled "After 3%" are for test specimens that had been exposed to salt solution for 200 hours with 3% sustained strain applied.

TABLE 6

Properties of test bar specimens prepared from 1A, 1E, and 1F.

| | Example 1A | | Example 1E | | Example 1F | |
|---|---|---|---|---|---|---|
| | Before | After 3% | Before | After 3% | Before | After 3% |
| Break strength (MPa) | 42 | 41 | 41 | 40 | 44 | 42 |
| Tensile Elongation at break (%) | 99 | 162 | 56 | 237 | 133 | 180 |
| Tensile Modulus (MPa) | 2065 | 1717 | 2144 | 1924 | 1903 | 1662 |

Upon test completion, there was no significant material degradation and as evidenced in changes in tensile yield strength. Visual inspection showed no observable surface cracking or crazing, further indicating resistance to salt exposure for the test specimens.

Example 5: Control of Surface Porosity of Extruded Conduit Specimens

Using the above-described Volatile Extraction Method during the extrusion process, the surface porosity of the extruded articles is controlled to a desired distribution.

When the extruded tube specimen is cut to visually inspect the cross-section, no visible porosity is observed. Furthermore, the absence of volatiles also provides smooth internal tube surface finish and regular inner tube diameter.

Example 6: Multi-Layer Conduit (Tube and Pipe)

Three multi-layer tubes were prepared. The multi-layer tubes have a round cross-sectional profile, with a wall that includes an inner layer and an outer layer, with a middle layer sandwiched between and in contact with the inner layer and the outer layer. Table 7A provides the details for the three co-extruded multi-layered tubes.

TABLE 7A

Details for co-extruded multi-layered tubes.

| Multi-layered Tube Construction | Tube Cross-section 6A | Tube Cross-section 6B | Tube Cross-section 6C |
| --- | --- | --- | --- |
| Number of layers co-extruded | 3 | 3 | 3 |
| Type | Non-reinforced | Reinforced | Reinforced |
| Materials | Various | All PA66 | Various |
| Inner Layer | | | |
| Thickness | 0.1-0.3 mm | 0.5-2 mm | 0.1-2 mm |
| Material | Tefzel HT2202, Daikin EP-7000, maleated-polypropylene, Dow Engage ™ series, HDPE, PA12, PA11, PPA | Tefzel HT2202, Daikin EP-7000, maleated-polypropylene, Dow Engage ™ series, HDPE, PA12, PA11, PPA | Modified PA66, Tefzel HT2202, Daikin EP-7000, maleated-polypropylene, Dow Engage ™ series, HDPE, PA12, PA11, PPA |
| Middle Layer | | | |
| Thickness | 0.7-2.5 mm | 0.4-1 mm | 0.4-1 mm |
| Material | Modified PA66 | 10-50% glass/carbon fiber/carbon black filled PA66 | 10-50% glass/carbon fiber/carbon black filled PA66 |
| Outer Layer | | | |
| Thickness | 0.1-0.3 mm | 0.5-2 mm | 0.5-2 mm |
| Material | same as inner layer | same as inner layer | same as inner layer |
| Total Tube Thickness | 0.9-3.1 mm | 1.4-5 mm | 1-5 mm |
| Inside Tube Dia. | 1.8-48.2 mm | 5-47.2 mm | 5-48 mm |
| Outside Tube Dia. | 8-50 mm | 15-50 mm | 15-50 mm |
| Tube Length | Varies as per end-use application | | |

Table 7B provides the details for co-extruded multi-layered pipes according to the present Examples. It will be understood that there no limit on the number of co-extruded layers and their combinations will depend on the end-use application.

TABLE 7B

Details for co-extruded multi-layered pipes 6D-6F.

| Multi-layered Pipe Construction | Pipe Cross-section having an inner layer (or skin) 6D | Pipe Cross-section having an outer layer (or skin) 6E | Pipe Cross-section having both, inner and outer layers (or skins) 6F |
| --- | --- | --- | --- |
| Number of layers co-extruded | 2 | 2 | 3 |
| Total Pipe Thickness | 5-80 mm | 5-80 mm | 5-80 mm |
| Pipe diameter | 2" to 24" | 2" to 24" | 2" to 24" |
| Pipe Length | Up to 2000-ft (can be coiled) for <6" dia. pipe | | |
| | Up to 400-ft for >6" dia. pipe | | |
| | Varies depending on end-use application | | |

TABLE 7B-continued

Details for co-extruded multi-layered pipes 6D-6F.

| Multi-layered Pipe Construction | Pipe Cross-section having an inner layer (or skin) 6D | Pipe Cross-section having an outer layer (or skin) 6E | Pipe Cross-section having both, inner and outer layers (or skins) 6F |
|---|---|---|---|
| Inner Layer | | | |
| Thickness | 0.5-5 mm | [No inner layer] | 0.5-5 mm |
| Material | Any of the modified PP, modified HDPE, PA12, PA6, 12, PPS, PPA, ETFE | | Any of the modified PP, modified HDPE, PA12, PA6, 12, PPS, PPA, ETFE |
| Middle Layer | | | |
| Thickness | 4.5-75 mm | 4.5-75 mm | 4-70 mm |
| Material | Modified PA66 | 10-50% glass/carbon fiber/carbon black filled PA66 | 10-50% glass/carbon fiber/carbon black filled PA66 |
| Outer Layer | | | |
| Thickness | [No outer layer] | 0.5-5 mm | 0.5-5 mm |
| Material | | Any of the modified PP, modified HDPE, PA12, PA6, 12, PPS, PPA, ETFE | Any of the modified PP, modified HDPE, PA12, PA6, 12, PPS, PPA, ETFE |

The co-extruded multi-layer pipes shown in Table 7B are useful in oil and gas processing, water management systems, and in other such applications as conduits for electrical and fiber optic cabling, hydrogen gas processing, and the like. The inner and/or outer layer (or conduit skin) materials may be appropriately selected to be chemically compatible in end-use fluid flow applications where the fluid is in direct contact.

Example 7. Glycolysis Resistance Testing

Some of the test bar specimens, prepared from the Example 1 formulations, were exposed to 50% aqueous glycol solution. The exposure time was maintained for 504 hours and 1008 hours at the constant test temperature of 120° C. Table 8 provides the measured Break Strength (in MPa), Tensile Elongation of Break (%), and Tensile Modulus (in MPa) for the tested specimens exposed to glycol at 120° C. The test results labeled "Before" are for test specimens that have not been exposed to glycol solution. Surprisingly, the elongation at break was observed to be >100% for Example 1(F) even after 1008 hrs of glycol exposure at 120° C.

TABLE 8

Glycolysis resistance of test bars prepared from 1A, 1E, and 1F.

| | Example 1A | | | Example 1E | | | Example 1F | | |
|---|---|---|---|---|---|---|---|---|---|
| | Before | 504 hr | 1008 hr | Before | 504 hr | 1008 hr | Before | 504 hr | 1008 hr |
| Break strength (MPa) | 42 | 27 | 23 | 41 | 26 | 25 | 44 | 28 | 26 |
| Tensile Elongation at break (%) | 99 | 101 | 55 | 56 | 97 | 43 | 133 | 112 | 105 |
| Tensile Modulus (MPa) | 2065 | 356 | 414 | 2144 | 458 | 458 | 1903 | 372 | 310 |

Example 8. Heat Aging Performance Testing

Heat aging performance testing was performed at 140° C. for some of the test bar specimens prepared from the Example 1 formulations. Table 9 provides the measured Break Strength (in MPa), Tensile Modulus (in MPa), and Notched Charpy 23° C. (kJ/m$^2$) for the tested specimens. The property measurements were conducted at 200 hr, 400 hr, 600 hr and 1000 hr heat aging increments. The test results labeled "Before" are for test specimens before the heat aging test.

TABLE 9

Heat aging performance testing of test bar specimens prepared from 1A, 1E, and 1F.

| | Example 1A | | | | | Example 1E | | | | | Example 1F | | | | |
|---|---|---|---|---|---|---|---|---|---|---|---|---|---|---|---|
| | Before | 200 h | 400 h | 600 h | 1000 h | Before | 200 h | 400 h | 600 h | 1000 h | Before | 200 h | 400 | 600 h | 1000 h |
| Break strength (MPa) | 47 | 48 | 48 | 48 | 46 | 43 | 46 | 45 | 46 | 43 | 46 | 47 | 46 | 46 | 41 |
| Tensile Modulus (MPa) | 1560 | 1742 | 1726 | 1702 | 1504 | 1537 | 1692 | 1728 | 1812 | 1552 | 1467 | 1526 | 1578 | 1576 | 1410 |
| Notched Charpy, 23° C. (kJ/m$^2$) | 102 | 85 | 72 | 64 | 49 | 101 | 80 | 65 | 57 | 47 | 107 | 88 | 74 | 68 | 53 |

Examples 9A-B. Glass Fiber Compounded Materials for Injection Molding Applications Formulations 1A and 1F were compounded with chopped E-glass fiber (ChopVantage® HP 3610 chopped strands) to obtain reinforced materials that are suitable for injection molded applications, as shown in Table 10 (all values are on the weight basis).

TABLE 10

Glass fiber-compounded materials.

| Component | Example 9A | General Range | Example 9B | General Range |
|---|---|---|---|---|
| Example 1A Formulation | 65% | 50-85% | — | — |
| Example 1F Formulation | — | — | 65% | 50-85% |
| Chopped E-glass Fiber | 35% | 15-50% | 35% | 15-50% |
| Zn Stearate/EBS Lubricant | | ≤0.5% | | ≤0.5% |

Surprisingly, in these embodiments, very high levels of glass fibers were incorporated for the illustrative specimens of Example 1A and 1F. In some aspect, the compounded polyamide formulation in the present disclosure may include from 1 wt. % up to 50 wt. % glass fiber, of the total weight, for example, from 10 wt. % up to 45 wt. % glass fiber, for example from 15 wt. % up to 42 wt. % glass fiber.

The test specimens of Table 10 had unexpected mechanical, chemical resistance, hydrolysis resistance, salt resistance, and fuel/oil resistance properties, as listed below.

Mechanical performance properties. Tensile modulus: 8000-10000 MPa. Elongation at break: 4%-5%. Un-Notched Charpy at 23° C.: 90-100 kJ/m$^2$. Un-Notched Charpy at −40° C.: 80-90 kJ/m$^2$. Notched Charpy at 23° C.: 20-30 kJ/m$^2$. Notched Charpy at −40° C.: 15-20 kJ/m$^2$.

Hydrolysis Resistance Properties; Hydrolysis resistance after exposed to glycol/water 50/50 at 130° C. for 1008 hrs. Tensile strength: 70-90 MPa. Elongation at break: >5%. Un-Notched Charpy at 23° C.: 40-50 kJ/m$^2$.

Salt Resistance Properties; Zinc Chloride resistance after exposed to 50% aqueous solution at 23° C. for 300 hrs. Tensile strength: 100 MPa. Elongation at break: >5%. Un-Notched Charpy at 23° C.: 70-90 kJ/m$^2$.

Urea Resistance Properties; Urea resistance after exposed to aqueous urea solution at 60-80° C. for 3000 hrs. Tensile strength: 70-90 MPa. Elongation at break: >5%. Un-Notched Charpy at 23° C.: 50-70 kJ/m$^2$.

Fuel/Oil Resistance Properties; Motor oil resistance after exposure at 150° C. for 5000 hrs. Tensile strength: 90-110 MPa. Elongation at break: 3-5%. Un-Notched Charpy at 23° C.: 40-70 kJ/m$^2$.

Example 10. Injection Molding (IM) of Compounded Resins of Example 9A-B in Molded Parts The glass-fiber reinforced materials from Examples 9A-B were injection molded into suitable shaped parts depending on the end-use application. These IM parts were subjected to the standard temperature cycling protocols practiced in the automotive OEM industry.

It was observed that the tested IM parts showed superior impact resistance and toughness during repeated temperature cycling testing.

Examples 11Q-Z. Compounding of PA Resins with Chain Extender Additive

Table 11 lists compositional ranges and some embodiments of several polyamide samples that were compounded using the general procedure detailed above.

TABLE 11

| | | Samples Q-Z. | | | | | | | | | |
|---|---|---|---|---|---|---|---|---|---|---|---|
| Component [basis: wt. %] | Range Wt. % | Q | R | S | T | U | V | W | X | Y | Z |
| Fed at the main throat (or hopper) of the compounding extruder | | | | | | | | | | | |
| High AEG PA66 (45 RV) | 20-75 | 49.8 | 74 | 49.3 | 38.8 | 24.5 | 27.8 | 37.8 | — | 69 | 69 |
| PA66/DI (45 RV) | 20-85 | — | — | — | 29 | 43.3 | 22 | 30 | 67.75 | — | — |
| PA610 | 5-50 | 18 | — | 18 | — | — | 18 | — | — | — | — |

TABLE 11-continued

Samples Q-Z.

| Component [basis: wt. %] | Range Wt. % | Q | R | S | T | U | V | W | X | Y | Z |
|---|---|---|---|---|---|---|---|---|---|---|---|
| Impact modifier (e.g., Amplify™ GR216) | 10-40 | 25 | 25 | 25 | 25 | 25 | 25 | 25 | 25 | 25 | 25 |
| Black MB Colorant (e.g.: carbon black or Nigrosine black dye) | 0.5-2.5 | 1.0 | — | 1.0 | 1.0 | 1.0 | 1.0 | 1.0 | 1.0 | — | — |
| Heat Stabilizer (e.g.: Cu-based or organic based such as Irganox® B1171) | 0.5-2 | 1.2 | 1.0 | 1.2 | 1.2 | 1.2 | 1.2 | 1.2 | 1.2 | 1.0 | 1.0 |
| Fed at mid-way (side feed) of compounding extruder | | | | | | | | | | | |
| High AEG PA66 (45 RV) | <10 | 4.75 | — | 4.75 | 4.75 | 4.75 | 4.75 | 4.5 | 4.25 | 4.75 | 4.5 |
| Chain Extender (e.g.: ZeMac E60) | 0.1-1 | 0.25 | — | 0.25 | 0.25 | 0.25 | 0.25 | — | 0.25 | 0.25 | 0.5 |
| Hydrolysis Stabilizer (e.g.: Stabaxol P100) | 0.1-3 | — | — | 0.5 | — | — | — | 0.5 | 0.5 | — | — |
| TOTAL | | 100 | 100 | 100 | 100 | 100 | 100 | 100 | 100 | 100 | 100 |

The compounding for the Table 11 compositions was performed using a conventional screw type extruder and in the 240-265° C. temperature range.

In the Formulation labeled "R" in Table 11, all the listed ingredients were fed at the main throat (or hopper) of the compounding extruder. In other Table 11 formulations, as described therein, a majority of the total polyamide quantity and modified polyolefin along with colorant and heat stabilizer additives were fed at the main throat (or hopper) of the compounding extruder. The remaining quantity of the polyamide was mixed with the chain extender and/or hydrolysis stabilizer additives and fed mid-way (via side feed) of the compounding extruder.

It was surprisingly observed that the above split-feed compounding method improved the compounding performance when compared against feeding all ingredients at the main throat (or hopper) of the compounding extruder. Although not bound by the theory, this observation led to a belief that late introduction of chain extender additive (as done mid-way during compounding) affects the initial interaction between polyamide component(s) and modified polyolefin in the front section. It is also presumed that the presence of chain extender introduced early-on in the front section of the compounder may be prone to instantly interacting with the polyamide component(s) before any modified polyolefin is able to do so. This instant interaction between the chain extension additive and the polyamide component(s) may lead to a rapid rise in the molecular weight build and viscosity, both being detrimental for compounding process operability. The interaction can be controlled by adding the chain extender a suitable distance away from the polyamide and modified polyolefin addition point (e.g., the main throat of the compounding extruder) to allow suitable time for the polyamide and modified polyolefin to react, by avoiding adding chain extender until a suitable percentage of the modified polyolefin has incorporated and/or reacted with the polyamide, or a combination thereof.

The above-compounded polyamide specimens Q through Z in Table 11 are obtained as cylindrical extruded pellets of dimension 2-4 mm diameter and 3-5 mm length.

Example 12. Extrusion of Compounded Resins of Example 11 in Pipe Shape

A round cross-section pipe was extruded from melted compounded polyamide resins of Examples 11Q-Z using a vented twin-screw extruder, as described in Example 2.

The extruded pipe herein has standard Aspect Ratio (L/D) of up to 15,000 with 5.08-61 cm (2" to 24") outside diameter "D" and wall thickness in the range of 5 to 80 mm. The extruded pipe is produced in a continuous fashion to either make continuous long section that can be loosely coiled or cut into straight short sections of desired lengths.

In one example, a 7.62 cm (3") outside diameter pipe having 10 mm thickness wall and about 1500 cm (50 ft) length straight section is continuously extruded (200 Aspect Ratio). In another example, a 10.16 cm (4") outside diameter pipe having 20 mm thickness wall and about 2000 cm (~100-ft) length straight section is continuously extruded (300 Aspect Ratio).

In one embodiment and by way of continuous extrusion of the present disclosure, it is possible to obtain a long-coiled pipe section having up to 15.24 cm (6") diameter and 2000 ft length. In another embodiment of the present disclosure, it is possible to obtain a straight pipe section having 20.32 cm (8") diameter and up to 400 ft length.

According to the present disclosure, it is possible to obtain a multi-layered conduit. Such multi-layered conduits may include annular layers or a surface skin or a jacket. Materials suitable for layering may include modified polypropylene, modified HDPE, PA12, PA612, PPS, PPA, ETFE, and such. In one example, the extruded pipe section may contain an inner layer (or skin) having a thickness of between 0.5-4 mm. In another example, the extruded pipe section may contain an outer layer (or skin) having a thickness of between 0.5-4 mm.

The extruded pipes may include straight designs for mono- as well as multi-layered piped of desired diameters, wall thicknesses, and linear lengths.

Example 13. Mechanical and Structural Strength

The test specimens of Table 11 have the mechanical and structural performance described in Table 12A-F. Table 12A-F data is measured for dry as molded (DAM) test specimens unless otherwise indicated. The measured heat deflection temperature (HDT) ranges for Table 12 formulations (DAM specimens) were 50-60° C. at 1.8 MPa and 75-90° C. at 0.45 MPa. The moisture absorption for the below test specimens was <2.1 wt % at equilibrium conditions.

TABLE 12A

Mechanical and structural strength of test specimens of Table 11.

|  | Specimen [R] of Table 11 | | Specimen [W] of Table 11 | |
| --- | --- | --- | --- | --- |
|  | DAM | COND | DAM | COND |
| Yield strength (MPa) | 40 | 30 | 41 | 30 |
| Yield elongation (%) | 5 | 40 | 6 | 50 |
| Break strength (MPa) | 46 | 44 | 45 | 42 |
| Tensile elongation at break (%) | 149 | 225 | 123 | 205 |

TABLE 12A-continued

Mechanical and structural strength of test specimens of Table 11.

|  | Specimen [R] of Table 11 | | Specimen [W] of Table 11 | |
| --- | --- | --- | --- | --- |
|  | DAM | COND | DAM | COND |
| Tensile modulus (MPa) | 1360 | 530 | 1200 | 450 |
| Notched Charpy, 23° C., kJ/m$^2$ | 107 | 132 | 111 | 134 |
| Notched Charpy, −30° C., kJ/m$^2$ | 90 | 85 | 85 | 89 |
| Un-Notched Charpy, 23° C., kJ/m$^2$ | NB | NB | NB | NB |
| Un-Notched Charpy, −30° C., kJ/m$^2$ | NB | NB | NB | NB |
| HDT @ 1.8 MPa (° C.) | 55 | — | Not available | — |
| HDT @ 0.45 MPa (° C.) | 81 | — | Not available | — |
| Moisture absorption, equi (%) | 2.2 | | 2.0 | |

"DAM": Dry as molded;
"COND": Conditioned specimen at 50% RH;
NB—No Break

TABLE 12B

Mechanical and structural strength of test specimens of Table 11.

| Measured property | Q | R | S | T | U | V | W | X | Y | Z |
| --- | --- | --- | --- | --- | --- | --- | --- | --- | --- | --- |
| MFI @ 290° C. and 15 kg (g/10 min) | 1.75 | 22.55 | 1.38 | 6.45 | 1.93 | 3.45 | 3.09 | 1.01 | 1.5 | 0.73 |
| Melting Point (° C.) | 258 | 262 | 259 | 254 | 239 | 256 | 259 | 242 | 260 | 258 |
| Crystallization Temperature (° C.) | 205 | 219 | 209 | 208 | 197 | 204 | 209 | 192 | 214 | 216 |
| Break Strength (MPa) | 43 | 47 | 44 | 47 | 45 | 43 | 45 | 45 | 47 | 48 |
| Yield Strength (MPa) | 38 | 39 | 38 | 45 | 41 | 39 | 41 | 42 | 41 | 43 |
| Elongation at Yield (%) | 5 | 5 | 5 | 5 | 6 | 5 | 6 | 6 | 5 | 6 |
| Elongation at Break (%) | 89 | 149 | 113 | 130 | 103 | 127 | 123 | 103 | 56 | 103 |
| Tensile Modulus (MPa) | 1312 | 1466 | 1290 | 1552 | 1274 | 1342 | 1168 | 1276 | 1474 | 1586 |
| Notched Charpy, 23° C. (kJ/m$^2$) | 108 | 107 | 111 | 102 | 107 | 109 | 111 | 109 | 103 | 106 |
| Notched Charpy, −30° C. (kJ/m$^2$) | 68 | 90 | 45 | 39 | 47 | 47 | 86 | 51 | 50 | 48 |
| Un-Notched Charpy, 23° C. (kJ/m$^2$) | NB | NB | NB | NB | NB | NB | NB | NB | NB | NB |
| Un-Notched Charpy, −30° C. (kJ/m$^2$) | NB | NB | NB | NB | NB | NB | NB | NB | NB | NB |

All specimens are Dry-as-molded [DAM];
"NB"—No Break

TABLE 12C

Glycolysis resistance of test bars prepared from Table 11 Specimens.

|  | Specimen [R] of Table 11 | | | Specimen [W] of Table 11 | | |
| --- | --- | --- | --- | --- | --- | --- |
|  | Before | 500 hr | 1000 hr | Before | 500 hr | 1000 hr |
| Yield Strength (MPa) | 40 | 23 | 22 | 41 | 22 | 22 |
| Yield Elongation (%) | 5 | 40 | 30 | 6 | 40 | 40 |
| Break strength (MPa) | 46 | 27 | 25 | 45 | 26 | 24 |
| Tensile Elongation at break (%) | 110 | 136 | 96 | 123 | 143 | 107 |
| Tensile Modulus (MPa) | 1360 | 266 | 290 | 1200 | 238 | 262 |

TABLE 12D

Heat aging performance testing of test bars prepared from Table 11 Specimens. The heat aging test was performed at 140° C.

|  | Specimen [R] of Table 11 | | | | Specimen [W] of Table 11 | | | |
| --- | --- | --- | --- | --- | --- | --- | --- | --- |
|  | Before | 250 h | 500 h | 1000 h | Before | 250 h | 500 h | 1000 h |
| Yield Strength (MPa) | 40 | 41 | 41 | N/A | 41 | 42 | 42 | N/A |
| Yield Elongation (%) | 5 | 5 | 5 | N/A | 6 | 6 | 6 | N/A |
| Break strength (MPa) | 46 | 46 | 46 | 43 | 45 | 46 | 46 | 46 |
| Tensile Elongation at break (%) | 110 | 97 | 64 | 7 | 123 | 114 | 105 | 42 |
| Tensile Modulus (MPa) | 1360 | 1274 | 1224 | 1276 | 1200 | 1336 | 1410 | 1438 |
| Notched Charpy, 23° C. (kJ/m$^2$) | 107 | 83 | 72 | 52 | 111 | 106 | 102 | 82 |

TABLE 12E

Heat aging performance testing of test bars prepared from several commercially available PA66, PA12, and PA612 materials shown in Table 5B.

|  | Commercial High Tough PA66 | | | | Commercial PA12 (Extrusion Grade) | | | | Commercial PA612 (Extrusion Grade) | | | |
| --- | --- | --- | --- | --- | --- | --- | --- | --- | --- | --- | --- | --- |
|  | Before | 250 h | 500 h | 1000 h | Before | 250 h | 500 h | 1000 h | Before | 250 h | 500 h | 1000 h |
| Break strength (MPa) | 50 | 46 | 41 | 24 | 41 | 37 | 37 | 38 | 54 | 53 | 55 | 53 |
| Tensile Elongation at break (%) | 45 | 5 | 3 | 2 | 163 | 134 | 47 | 24 | 20 | 24 | 20 | 5 |
| Tensile Modulus (MPa) | 1776 | 1686 | 1704 | 1736 | 960 | 840 | 998 | 1142 | 1970 | 2008 | 2074 | 2108 |
| Notched Charpy, 23° C. (kJ/m$^2$) | 72 | 30.6 | 28.5 | 22.1 | 88 | 63.9 | 35.0 | 5.3 | 43 | 28.5 | 8.0 | 1.7 |

TABLE 12F

Salt Resistance (ZnCl$_2$) of test bars prepared from Table 11 Specimens.

|  | Specimen [R] of Table 11 | | | Specimen [W] of Table 11 | | |
| --- | --- | --- | --- | --- | --- | --- |
|  | Before | After 0% | After 3% | Before | After 0% | After 3% |
| Yield Strength (MPa) | 39 | 38 | 38 | Not measured | | |
| Yield Elongation (%) | 4 | 40 | 40 | | | |
| Break strength (MPa) | 44 | 43 | 42 | 46 | 42 | 45 |
| Tensile Elongation at break (%) | 133 | 156 | 180 | 154 | 145 | 171 |
| Tensile Modulus (MPa) | 1903 | 1782 | 1662 | 731 | 552 | 517 |

Examples 14A-O. Glass Fiber Compounded Materials for Injection Molding Applications Formulation 1F was compounded with chopped E-glass fiber (e.g.: ChopVantage® HP 3610 chopped strands) and polyamide (e.g., nylon-6,6 such as 45 RV High AEG PA66) to obtain reinforced materials having glass fiber reinforcement in the 35-45 wt. % range. Such reinforced compounded materials are suitable for injection molded applications. Tables 13A-C (weight basis) show these compounded materials.

TABLE 13A

Formulation 1F with 35 wt. % glass fiber reinforcement.

| Component (Basis: wt. %) | Example 14A | Example 14B | Example 14C | Example 14D | Example 14E |
| --- | --- | --- | --- | --- | --- |
| Example 1F Formulation | 57.5 | 49.5 | 42 | 34 | 65 |
| Nylon-6,6 (e.g., 45 RV High AEG PA66) | 7.5 | 15.5 | 23 | 31 | — |
| Chopped E-glass Fiber | 35 | 35 | 35 | 35 | 35 |

TABLE 13A-continued

Formulation 1F with 35 wt. % glass fiber reinforcement.

| Component (Basis: wt. %) | Example 14A | Example 14B | Example 14C | Example 14D | Example 14E |
|---|---|---|---|---|---|
| Heat Stabilizer (e.g.: Cu-based or organic based such as Irganox ® B1171) | <1 | <1 | <1 | <1 | <1 |
| TOTAL | 100 | 100 | 100 | 100 | 100 |

TABLE 13B

Formulation 1F with 40 wt. % glass fiber reinforcement.

| Component (Basis: wt. %) | Example 14F | Example 14G | Example 14H | Example 14I | Example 14J |
|---|---|---|---|---|---|
| Example 1F Formulation | 53 | 46 | 38.5 | 31.5 | 60 |
| Nylon-6,6 (e.g., 45 RV High AEG PA66) | 7 | 14 | 21.5 | 28.5 | — |
| Chopped E-glass Fiber | 40 | 40 | 40 | 40 | 40 |
| Heat Stabilizer (e.g.: Cu-based or organic based such as Irganox ® B1171) | <1 | <1 | <1 | <1 | <1 |
| TOTAL | 100 | 100 | 100 | 100 | 100 |

TABLE 13C

Formulation 1F with 45 wt. % glass fiber reinforcement.

| Component (Basis: wt. %) | Example 14K | Example 14L | Example 14M | Example 14N | Example 14O |
|---|---|---|---|---|---|
| Example 1F Formulation | 48.5 | 42 | 35.5 | 29 | 55 |
| Nylon-6,6 (e.g., 45 RV High AEG PA66) | 6.5 | 13 | 19.5 | 26 | — |
| Chopped E-glass Fiber | 35 | 35 | 35 | 35 | 45 |
| Heat Stabilizer (e.g.: Cu-based or organic based such as Irganox ® B1171) | <1 | <1 | <1 | <1 | <1 |
| TOTAL | 100 | 100 | 100 | 100 | 100 |

In Examples 14A-O, the polyamide used was poly(hexamethylene adipamide) or nylon-6,6.

It was observed that the toughness performance of injection-molded parts obtained from the above compounded materials could be varied depending on the level of polyamide and glass fiber reinforcement used in the material. Tables 14A-L list the measured mechanical strength properties characteristics of some of the Table 13A-C compounded materials prepared and tested according to the present disclosure. All specimens were tested under a dry-as-molded (DAM) condition unless otherwise indicated.

TABLE 14A

Mechanical strength properties of compounded materials.

| Performance Property [measured for DAM specimen] | Example | | | | | |
|---|---|---|---|---|---|---|
| | 14B | 14D | 14E | 14G | 14I | 14J |
| Tensile Strength (MPa) | 140 | 147 | 124 | 150 | 164 | 135 |
| Elongation at Break (%) | 5.9 | 5.2 | 6.3 | 5.3 | 4.7 | 5.9 |
| Tensile Modulus (GPa) | 9.2 | 9.2 | 8.5 | 10.5 | 11.2 | 9.5 |
| Un-Notched Charpy, −40° C. (KJ/m$^2$) | 112 | 108 | 108 | 115 | 113 | 115 |
| Un-Notched Charpy, −23° C. (KJ/m$^2$) | 108 | 104 | 110 | 109 | 106 | 100 |
| Notched Charpy, −40° C. (KJ/m$^2$) | 15 | 13 | 16 | 15 | 14 | 17 |
| Notched Charpy, −23° C. (KJ/m$^2$) | 24 | 17 | 29 | 23 | 18 | 30 |

TABLE 14B

Mechanical strength properties of compounded materials.

| | Example ID: | | | | | |
|---|---|---|---|---|---|---|
| | 14B | | 14D | | 14E | |
| | Dry | Cond | Dry | Cond | Dry | Cond |
| Tensile Strength (MPa) | 140 | 106 | 147 | 107 | 124 | 95 |
| Tensile Modulus (MPa) | 9199 | 5798 | 9232 | 5740 | 8506 | 5226 |
| Elongation at Break (%) | 5.9 | 10.7 | 5.2 | 10.1 | 6.3 | 11.3 |
| Un-Notched Charpy, 23° C. (KJ/m$^2$) | 108 | 117 | 104 | 115 | 110 | 117 |
| Un-Notched Charpy, −30° C. (KJ/m$^2$) | 112 | 110 | 108 | 103 | 108 | 104 |
| Notched Charpy, 23° C. (KJ/m$^2$) | 24 | 32 | 17 | 26 | 29 | 40 |
| Notched Charpy, −30° C. (KJ/m$^2$) | 15 | 16 | 13 | 14 | 16 | 17 |
| Moisture Absorption (%) | 1.4 | | 1.7 | | 1.3 | |

TABLE 14C

Mechanical strength properties of compounded materials.

| | Example ID: | | | | | |
|---|---|---|---|---|---|---|
| | 14G | | 14I | | 14J | |
| | Dry | Cond | Dry | Cond | Dry | Cond |
| Tensile Strength (MPa) | 150.0 | 112.0 | 164.0 | 121.0 | 135 | 103 |
| Tensile Modulus (MPa) | 10460 | 6622 | 11183 | 7176 | 9530 | 6158 |
| Elongation at Break (%) | 5.3 | 9.6 | 4.7 | 8.4 | 5.9 | 10.4 |
| Un-Notched Charpy, 23° C. (KJ/m$^2$) | 109 | 120 | 106 | 117 | 100 | 123 |
| Un-Notched Charpy, −30° C. (KJ/m$^2$) | 115 | 108 | 113 | 108 | 115 | 110 |
| Notched Charpy, 23° C. (KJ/m$^2$) | 15 | 33 | 18 | 27 | 30 | 38 |
| Notched Charpy, −30° C. (KJ/m$^2$) | 23 | 16 | 14 | 14 | 17 | 19 |
| Density (g/cc) | 1.33 | | 1.37 | | | |
| Moisture Absorption (%) | | | | | 1.3 | |

TABLE 14D

Mechanical strength properties of compounded materials after 250 h of Heat Aging at 150° C.

| | Example | | | | | |
|---|---|---|---|---|---|---|
| Performance Property | 14B | 14D | 14E | 14G | 14I | 14J |
| Tensile Strength (MPa) | 146.0 | 153.2 | 126.8 | 155.5 | 171.8 | 135.2 |
| Elongation at Break (%) | 5.1 | 4.8 | 5.2 | 4.8 | 4.2 | 4.7 |
| Tensile Modulus (GPa) | 9.118 | 8.870 | 8.226 | 10.248 | 11.132 | 9.730 |
| Un-Notched Charpy (KJ/m$^2$) - 15J hammer at room temperature | 77.38 | 58.91 | 68.58 | 68.05 | 66.24 | 66.98 |
| Notched Charpy (KJ/m$^2$) - 2J hammer at room temperature | 26.17 | 20.54 | 29.41 | 25.8 | 21.86 | 28.8 |

TABLE 14E

Mechanical strength properties of compounded materials after 500 h of Heat Aging at 150° C.

| | Example | | | | | |
|---|---|---|---|---|---|---|
| Performance Property | 14B | 14D | 14E | 14G | 14I | 14J |
| Tensile Strength (MPa) | 145.3 | 154.2 | 128.2 | 153.4 | 168.5 | 133.6 |
| Elongation at Break (%) | 4.6 | 4.3 | 5.0 | 4.3 | 3.8 | 4.3 |
| Tensile Modulus (GPa) | 8.960 | 9.218 | 8.194 | 10.258 | 10.954 | 9.316 |

TABLE 14E-continued

Mechanical strength properties of compounded materials after 500 h of Heat Aging at 150° C.

| Performance Property | Example | | | | | |
|---|---|---|---|---|---|---|
| | 14B | 14D | 14E | 14G | 14I | 14J |
| Un-Notched Charpy (KJ/m$^2$) - 15J hammer at room temperature | 57.48 | 47.63 | 61.91 | 54.0 | 46.21 | 55.19 |
| Notched Charpy (KJ/m$^2$) - 2J hammer at room temperature | 24.46 | 19.10 | 27.69 | 24.25 | 21.22 | 27.37 |

TABLE 14F

Mechanical strength properties of compounded materials after 1000 h of Heat Aging at 150° C.

| Performance Property | Example | | | | | |
|---|---|---|---|---|---|---|
| | 14B | 14D | 14E | 14G | 14I | 14J |
| Tensile Strength (MPa) | 140.1 | 146.9 | 122.4 | 147.2 | 158.0 | 128.3 |
| Elongation at Break (%) | 3.3 | 3.0 | 3.4 | 2.9 | 2.7 | 2.9 |
| Tensile Modulus (GPa) | 9.070 | 9.558 | 8.196 | 10.642 | 11.062 | 9.204 |
| Un-Notched Charpy (KJ/m$^2$) - 15J hammer at room temperature | 38.75 | 39.58 | 35.98 | 42.88 | 41.62 | 34.11 |
| Notched Charpy (KJ/m$^2$) - 2J hammer at room temperature | 22.60 | 18.17 | 25.61 | 23.27 | 20.30 | 25.28 |

TABLE 14G

Glycolysis resistance of test bars prepared from Example 14 Specimens.

| | Example ID: | | | | | |
|---|---|---|---|---|---|---|
| | 14B | | 14D | | 14E | |
| | 0 hr | 500 hr | 0 hr | 500 hr | 0 hr | 500 hr |
| Tensile strength (MPa) | 139.7 | 64.7 | 147.0 | 68.9 | 124.1 | 61.9 |
| Elongation @ break (%) | 5.9 | 7.3 | 5.2 | 7.4 | 6.3 | 8.2 |
| Chord Modulus (GPa) | 9.2 | 3.826 | 9.2 | 3.860 | 8.5 | 3.340 |

TABLE 14H

Glycolysis resistance of test bars prepared from Example 14 Specimens.

| | Example ID: | | | | | |
|---|---|---|---|---|---|---|
| | 14G | | 14I | | 14J | |
| | 0 hr | 500 hr | 0 hr | 500 hr | 0 hr | 500 hr |
| Tensile strength (MPa) | 149.9 | 71.3 | 164.2 | 76.8 | 135.0 | 71.3 |
| Elongation @ break (%) | 5.3 | 6.7 | 4.7 | 5.9 | 5.9 | 6.5 |
| Chord Modulus (GPa) | 10.5 | 3.788 | 11.2 | 4.660 | 9.5 | 4.220 |

TABLE 14I

Salt [ZnCl$_2$] resistance of test bars prepared from Example 14 Specimens. Conditions: 50% ZnCl$_2$ solution, 23° C., 200 hrs, 0% sustained strain (ASTM test bars)

| | Example ID: | | | |
|---|---|---|---|---|
| | 14G | | 14I | |
| | Before | After | Before | After |
| Tensile strength (MPa) | 150 | 136 | 167 | 152 |
| Elongation @ break (%) | 5.3 | 5.8 | 4.8 | 5 |

TABLE 14J

Tensile Stress versus Strain Performance of compounded materials at 23° C.

| At Tensile Strain (%) | Tensile Stress (MPa) | | | | | |
|---|---|---|---|---|---|---|
| | 14B | 14D | 14E | 14G | 14I | 14J |
| 0 | 0 | 0 | 0 | 0 | 0 | 0 |
| 0.5 | 43 | 45 | 40 | 50 | 53 | 43 |
| 1 | 78 | 80 | 69 | 88 | 96 | 78 |
| 1.5 | 98 | 103 | 85 | 108 | 120 | 95 |
| 2 | 113 | 120 | 97 | 123 | 138 | 108 |
| 2.5 | 124 | 132 | 106 | 134 | 149 | 117 |
| 3 | 131 | 141 | 112 | 141 | 158 | 123 |
| 3.5 | 135 | 144 | 116 | 145 | 161 | 127 |
| 4 | 138 | 145 | 119 | 148 | 163 | 130 |
| 4.5 | 139 | 146 | 121 | 149 | | 132 |
| 4.7 | | | | | 164 | |
| 5 | | | 122 | | | 134 |
| 5.2 | | 147 | | | | |
| 5.3 | | | | | 150 | |
| 5.5 | | | 123 | | | |
| 5.9 | 140 | | | | | 135 |
| 6.3 | | | 124 | | | |

TABLE 14K

Published Mechanical strength properties of some commercially available materials. Ref: https://www.campusplastics.com/campus/en/datasheet

|  | Grade 1 - 33% glass fiber reinforced heat stabilized, impact modified PA66 | | Grade 2 - 35% glass reinforced, heat stabilized, impact modified PA66 | | Grade 3 - 33% glass reinforced heat stabilized, impact modified PA66 | | 30% glass fiber reinforced heat stabilized, impact modified PA6 | | 33% glass fiber reinforced heat stabilized, impact modified PA6 | |
|---|---|---|---|---|---|---|---|---|---|---|
|  | Dry | Cond | Dry | Cond | Dry | Cond | Dry | Cond | Dry | Cond |
| Tensile Strength (MPa) | 146 | 108 | 137 | 107 | 147 | 107 | 138 | 78 | 125 | 70 |
| Tensile Modulus (MPa) | 8900 | 6200 | 8480 | 6750 | 9300 | 5400 | 8650 | 4850 | 9000 | 4500 |
| Elongation at Break (%) | 3.7 | 7 | 4.5 | 8.4 | 3.2 | 6.8 | 3.6 | 5.1 | 3.5 | 8 |
| Un-Notched Charpy, 23° C. (KJ/m$^2$) | 97 | 98 | 98 | 97 | 87 | 99 | 95 | 110 | 105 | 100 |
| Un-Notched Charpy, −30° C. (KJ/m$^2$) | 106 | 100 | 106 | 104 | 94 | 94 | 90 | 101 | 115 | 95 |
| Notched Charpy, 23° C. (KJ/m$^2$) | 20 | 28 | 21 | 27 | 23 | 28 | 20 | 35 | 35 | 40 |
| Notched Charpy, −30° C. (KJ/m$^2$) | 18 | 17 | 16 | 15 | 15 | 8 | 15 | 9.7 | 20 | 17 |
| HDT at 0.45 MPa (° C.) | 261 |  | 260 |  | 260 |  | 220 |  | 215 |  |
| HDT at 1.8 MPa (° C.) | 246 |  | 242 |  | 245 |  | 200 |  | 200 |  |
| Shrinkage, Parallel (%) | 0.3 |  | 0.3 |  |  |  | 0.3 |  | 0.2 |  |
| Shrinkage, Normal (%) | 0.7 |  | 1 |  |  |  | 0.7 |  | 0.9 |  |
| Moisture absorption (%) | 1.5 |  |  |  |  |  | 2 |  | 1.7 |  |
| Density (g/cc) | 1.33 |  | 1.33 |  | 1.33 |  | 1.34 |  |  |  |

TABLE 14L

Tensile Stress versus Strain Performance of commercially available material shown in Table 14K and at 23° C.

| | Tensile Stress (MPa) Grade 1 - 33% glass fiber reinforced heat stabilized impact modified polyamide 66 resin | |
|---|---|---|
| At Tensile Strain (%) | Dry | Cond |
| 0 | 0 | 0 |
| 0.5 | 44.99 | 31.01 |
| 0.6 | 53.03 |  |
| 0.7 | 61.1 | 40.46 |
| 0.8 | 68.34 |  |
| 0.9 | 75.28 | 48.68 |
| 1 | 81.76 |  |
| 1.1 | 87.89 | 55.35 |
| 1.3 | 98.72 | 62.17 |
| 1.4 | 103.83 |  |
| 1.5 |  | 68.02 |
| 1.6 | 112.62 |  |
| 1.7 |  | 73.23 |
| 1.8 | 119.99 |  |
| 1.9 |  | 77.95 |
| 2 | 125.92 |  |
| 2.1 |  | 82.24 |
| 2.2 | 131.08 |  |
| 2.3 |  | 85.89 |
| 2.4 | 135.25 |  |
| 2.5 |  | 89.48 |
| 2.6 | 138.93 |  |
| 2.7 |  | 92.55 |
| 2.8 | 141.91 |  |
| 2.9 |  | 95.36 |
| 3 | 144.21 |  |
| 3.1 |  | 97.82 |
| 3.2 | 145.85 |  |
| 3.3 |  | 99.91 |
| 3.4 | 146.5 |  |
| 3.5 |  | 101.6 |
| 3.8 |  | 103.8 |
| 4.1 |  | 105.55 |
| 4.8 |  | 107.31 |

Example 15. Extrusion of Compounded Resins of Example 11 in Monolayer Pipe Shape A round cross-section monolayer pipe was extruded from melted compounded polyamide resin formulation "T" of Example 11 (Table 11) except that the black MB colorant additive used was a UV-grade carbon black at about 2.0 wt. % active concentration level in the total formulation. Pipe extrusion was performed using a vented twin-screw extruder, as described in Example 2. Similar round cross-section pipe sections can be extruded using any of the formulations described in Table 11 of Example 11.

Example 16. Extrusion of Compounded Resins of Example 11 in Multi-Layer Pipe Shape A round cross-section multi-layer pipe was extruded from melted compounded polyamide resin formulation "W" of Example 11 (Table 11) that contains about 1.0 wt. % (active in total) non-UV grade black MB colorant. Pipe extrusion was performed using a vented twin-screw extruder, as described in Example 2. Similar round cross-section pipe sections can be extruded using any of the formulations described in Table 11 of Example 11.

The multilayer wall pipe section included a 20-mm thickness annular core section of formulation "W" of Table 11 (Example 11) having an inside 3-mm thick as well as outside 3-mm thick surface skin of HDPE. The multilayer wall pipe section was about 4.5" O.D. and 50-ft long. Such durable pipe is industrially useful for conveying flowable materials that are compatible with direct HDPE surface contact.

Examples 17A-D. Compounding of Resin Formulations

About 3,000 kgs of each, 18A, 18B and 18D formulations, and about 1,000 kgs of 18C formulation, as represented in Table 15, are prepared by compounding the listed ingredients in their respective amounts.

TABLE 15

Example 17A-D formulations.

| Component [basis: wt. %] | 17A | 17B | 17C | 17D |
|---|---|---|---|---|
| Fed at the main throat (or hopper) of compounding extruder | | | | |
| 48 RV PA66 (U4800) | — | — | 75.1 | — |
| High AEG PA66 (45 RV) | 68 | 38.8 | — | 37.8 |
| PA66/DI (45 RV) | — | 29 | — | 29 |

TABLE 15-continued

Example 17A-D formulations.

| Component [basis: wt. %] | 17A | 17B | 17C | 17D |
|---|---|---|---|---|
| Impact Modifier (e.g.: Dow Amplify ™ GR216 or ExxonMobil VA1840) | 25 | 25 | 22 | 25 |
| Black Colorant (e.g.: carbon black (CB), or Nigrosine black dye) | colspan 1-3% loading For example - 1% active loading of non-UV grade carbon black or 2% active loading of UV grade | | | |
| Heat Stabilizer (e.g.: Cu-based or organic based such as Irganox ® B1171) | colspan 0.5-2.0 | | | |
| Fed at mid-way (side feed) of compounding extruder | | | | |
| High AEG PA66 (45 RV) | 4.75 | 4.75 | — | 4.5 |
| Chain Extender (e.g.: ZeMac E60) | 0.25 | 0.25 | — | — |
| Hydrolysis Stabilizer (e.g.: Stabaxol ® P100) | — | — | — | 0.5 |
| TOTAL | 100 | 100 | 100 | 100 |

"CB"—Carbon Black.

For 17A and 17B compounding, the High AEG PA66 feed was split with a major portion fed at the main throat (or hopper) of the compounding extruder with other listed ingredients. The remaining portion was blended with the chain extender additive and the blend is fed at mid-way (side feed) of the compounding extruder. Homogeneous dispersion and mixing of the ingredients were observed in each case.

The compounding extruder was a vented twin-screw extruder, as described in Example 2. The screw speed is 450 RPM with 70-80% torque. The compounded resin, in each case, was pelletized into 3 mm diameter and 3-4 mm extrudates with a moisture level of below 0.15 wt %.

The extrudates obtained as above were suitable for extruding conduits and pipes of the desired dimensions.

Example 18. Extrusion of Compounded Resins of Example 11 in Monolayer Conduit Shape As a non-limiting illustration, round cross-section, 2.54 cm (1") outside diameter (×3 mm wall thickness) monolayer conduits were extruded from each of the melted compounded polyamide resin formulations "Q" and "W" of Example 11 (Table 11) that contained about 1.0 wt % (active in total) non-UV grade black MB colorant. Extrusion was performed using a vented twin-screw extruder, as described in Example 2. Similar round cross-section conduits can be extruded using any of the formulations described in Table 11 of Example 11. The extruded conduit lengths can be varied to as short as inches to continuous large coilable sections, for example, 10-ft, 100-ft, 200-ft, 500-ft, and such.

Example 19. Extrusion of Compounded Resins of Example 11 in Monolayer Conduit Shape As a non-limiting illustration, round cross-section, 10.16 cm (4") outside diameter [×3 mm wall thickness] monolayer conduits are extruded from each, melted compounded polyamide resin formulations "Q" and "W" of Example 11 (Table 11) except that the black MB colorant additive used is a UV-grade carbon black at about 2.0 wt. % active concentration level in the total formulation. Extrusion was performed using a vented twin-screw extruder, as described in Example 2. Similar round cross-section conduits can be extruded using any of the formulations described in Table 11 of Example 11. The extruded conduit lengths can be varied to as short as inches to continuous large coilable sections, for example, 10-ft, 50-ft, 100-ft, 500-ft, and such.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Aspects

The following exemplary Aspects are provided, the numbering of which is not to be construed as designating levels of importance:

Aspect 1 provides a composition comprising
  a condensation polyamide, wherein the condensation polyamide is at least 30 wt % of the composition, wherein the condensation polyamide is the predominant polyamide in the composition; and
  from ≥10 wt % to ≤50 wt % of a maleated polyolefin (e.g., ≥15 wt % to ≤50 wt %), wherein the maleated polyolefin comprises maleic anhydride grafted onto a polyolefin backbone, the maleated polyolefin having a grafted maleic anhydride incorporation of ≥0.05 to ≤1.5 wt % based on total weight of the maleated polyolefin;
  wherein, optionally,
    the maleated polyolefin, or domains thereof, is/are uniformly distributed in the condensation polyamide or in the composition (e.g., with domains having a largest dimension of less than 1 micron, or 5 nm to less than 1,000 nm, or from 9 to 400 nm), or
    the condensation polyamide has an AEG of ≥65 milliequivalents per kg (meq/kg) and ≤130 meq/kg (e.g., ≥70 meq/kg and ≤125 meq/kg), or
    the condensation polyamide has an RV of at least 35 (e.g., at least 40, or at least 45), or
    the condensation polyamide comprises nylon 66, nylon 66/6T, nylon 66/DI, or a combination thereof, or
  a combination thereof.

Aspect 2 provides the composition of Aspect 1, wherein the condensation polyamide is chosen from nylon 66, nylon 66/6T, nylon 66/DI, and a combination thereof.

Aspect 3 provides the composition of any one of Aspects 1-2, wherein the condensation polyamide is nylon 66.

Aspect 4 provides the composition of any one of Aspects 1-3, wherein the condensation polyamide is 30-99.9 wt % of the composition.

Aspect 5 provides the composition of any one of Aspects 1-4, wherein the condensation polyamide is 60-99.9 wt % of the composition.

Aspect 6 provides the composition of any one of Aspects 1-5, wherein the condensation polyamide is 90-99.9 wt % of the composition.

Aspect 7 provides the composition of any one of Aspects 1-6, wherein the composition further comprises one or more other polyamides, copolymers thereof, or combinations thereof, in addition to the condensation polyamide.

Aspect 8 provides the composition of any one of Aspects 1-7, wherein the composition further comprises an additional polyamide comprising nylon 66, nylon 612, nylon 610, nylon 12, nylon 6, nylon 66/6T, nylon 66/DI, nylon 66/DI, nylon 66/D6, nylon 66/DT, nylon 66/610, nylon 66/612, a polyamide copolymer, or a combination thereof.

Aspect 9 provides the composition of Aspect 8, wherein the additional polyamide comprises nylon 66, nylon 612, nylon 610, nylon 12, nylon 6, nylon 66/6T, nylon 66/DI, nylon 66/DI, nylon 66/D6, nylon 66/DT, nylon 66/610, nylon 66/612, or a combination thereof.

Aspect 10 provides the composition of any one of Aspects 8-9, wherein the additional polyamide is ≥15 to ≤85 wt % of the composition.

Aspect 11 provides the composition of any one of Aspects 8-10, wherein the additional polyamide is ≥20 to ≤70 wt % of the composition.

Aspect 12 provides the composition of any one of Aspects 1-11, wherein the condensation polyamide has an AEG of ≥80 meq/kg and ≤125 meq/kg.

Aspect 13 provides the composition of any one of Aspects 1-12, wherein the condensation polyamide has an AEG of ≥80 meq/kg and ≤120 meq/kg.

Aspect 14 provides the composition of any one of Aspects 1-13, comprising ≥1 wt % to ≤50 wt % glass fibers.

Aspect 15 provides the composition of any one of Aspects 1-14, comprising ≥10 wt % to ≤42 wt % glass fibers.

Aspect 16 provides the composition of any one of Aspects 1-15, comprising ≥10 wt % to ≤35 wt % glass fibers.

Aspect 17 provides the composition of any one of Aspects 1-16, comprising ≥15 wt % to ≤30 wt % glass fibers.

Aspect 18 provides the composition of any one of Aspects 1-17, wherein the maleated polyolefin comprises a polyolefin backbone that comprises EPDM, ethylene-octene, polyethylene, polypropylene, or a combination thereof.

Aspect 19 provides the composition of any one of Aspects 1-18, wherein the maleated polyolefin is free of EPDM.

Aspect 20 provides the composition of any one of Aspects 1-19, wherein the maleated polyolefin has a grafted maleic anhydride incorporation of ≥0.1 to ≤1.4 wt % based on total weight of the maleated polyolefin.

Aspect 21 provides the composition of any one of Aspects 1-20, wherein the maleated polyolefin has a grafted maleic anhydride incorporation of ≥0.15 to ≤1.25 wt % based on total weight of the maleated polyolefin.

Aspect 22 provides the composition of any one of Aspects 1-21, wherein the maleated polyolefin has a glass transition temperature ($T_g$) of ≥−70° C. to ≤0° C.

Aspect 23 provides the composition of any one of Aspects 1-22, wherein the maleated polyolefin has a glass transition temperature ($T_g$) of ≥−60° C. to ≤−20° C.

Aspect 24 provides the composition of any one of Aspects 1-23, wherein the maleated polyolefin has a glass transition temperature ($T_g$) of ≥−60° C. to ≤−30° C.

Aspect 25 provides a reacted composition that is a reaction product of the composition of any one of Aspects 1-24, wherein the reacted composition comprises a polyamide-polyolefin copolymer formed from at least partial reaction of the condensation polyamide and the maleated polyolefin of the composition of any one of Aspects 1-24.

Aspect 26 provides the reacted composition of Aspect 25, wherein the reacted composition comprises the polyamide-polyolefin copolymer in a concentration range of ≥50 to ≤7500 ppmw, based on the total weight of the reacted composition.

Aspect 27 provides the reacted composition of any one of Aspects 25-26, wherein the reacted composition comprises the polyamide-polyolefin copolymer in a concentration range of ≥100 to ≤4900 ppmw, based on the total weight of the reacted composition.

Aspect 28 provides the reacted composition of any one of Aspects 25-27, wherein the reacted composition comprises the polyamide-polyolefin copolymer in a concentration range of ≥225 to ≤3750 ppmw, based on the total weight of the reacted composition.

Aspect 29 provides a composition comprising:
a condensation polyamide having an AEG of ≥65 milliequivalents per kg (meq/kg) and ≤130 meq/kg (e.g., ≥70 meq/kg and ≤125 meq/kg), wherein the condensation polyamide is nylon 66 and is at least 30 wt % of the composition, wherein the nylon 66 is the predominant polyamide in the composition; and
from ≥10 wt % to ≤50 wt % of a maleated polyolefin (e.g., ≥15 wt % to ≤50 wt %), wherein the maleated polyolefin comprises maleic anhydride grafted onto a polyolefin backbone, the maleated polyolefin having a grafted maleic anhydride incorporation of ≥0.05 to ≤1.5 wt % based on total weight of the maleated polyolefin.

Aspect 30 provides a reacted composition that is a reaction product of the composition of Aspect 29, wherein the reacted composition comprises a polyamide-polyolefin copolymer formed from at least partial reaction of the condensation polyamide and the maleated polyolefin of the composition of Aspect 29.

Aspect 31 provides a compounded polyamide composition comprising:
the composition of any one of Aspects 1-24, the reacted composition of any one of Aspects 25-28, or a combination thereof; and
one or more other components.

Aspect 32 provides the compounded polyamide composition of Aspect 31, wherein the compounded polyamide composition is extrudable.

Aspect 33 provides the compounded polyamide composition of any one of Aspects 31-32, wherein the one or more other components comprise a modified polyphenylene ether, an impact modifier, a flame retardant, a chain extender, a heat stabilizer, a colorant additive, a filler, a conductive fiber, glass fibers, another polyamide other than the condensation polyamide, or a combination thereof.

Aspect 34 provides the compounded polyamide composition of any one of Aspects 31-33, wherein the one or more other components comprise a chain extender, wherein the chain extender is ≥0.05 to ≤5 wt % of the compounded polyamide composition.

Aspect 35 provides the compounded polyamide composition of any one of Aspects 31-34, wherein the chain extender comprises a dialcohol, a bis-epoxide, a polymer comprising epoxide functional groups, a polymer comprising anhydride functional groups, a bis-N-acyl bis-caprolactam, a diphenyl carbonate, a bisoxazoline, an oxazolinone, a diisocyanate, an organic phosphite, a bis-ketenimine, a dianhydride, a carbodiimide, a polymer comprising carbodiimide functionality, or a combination thereof.

Aspect 36 provides the compounded polyamide composition of any one of Aspects 31-35, wherein the chain extender comprises a maleic anhydride-polyolefin copolymer, such as an alternating copolymer of maleic anhydride and ethylene.

Aspect 37 provides the compounded polyamide composition of any one of Aspects 31-36 comprising:
the condensation polyamide;
the maleated polyolefin that is ≥10 to ≤50 wt % of the compounded polyamide composition;

an additional polyamide that is ≥15 to ≤85 wt % of the compounded polyamide composition; and a chain extender that is ≥0.05 to ≤5 wt % of the compounded polyamide composition.

Aspect 38 provides the compounded polyamide composition of any one of

Aspects 31-37 comprising:
50-80 wt % of the condensation polyamide;
0 to 20 wt % polyamide 612;
0 to 20 wt % modified polyphenylene ether;
10-50 wt % of the maleated polyolefin;
0 to 30 wt % flame retardant;
0 to 10 wt % combined chain extender, heat stabilizer and colorant additives; and
0 to 40 wt % combined filler and/or conductive fiber additives;
wherein nylon 66 and the maleated polyolefin are optionally partially reacted to form a polyamide-polyolefin.

Aspect 39 provides the composition of any one of Aspects 1-24, the reacted composition of any one of Aspects 25-28, or the compounded polyamide composition of any one of Aspects 31-38, comprising an additional polyamide comprising nylon 66, nylon 612, nylon 610, nylon 12, nylon 6, nylon 66/6T, nylon 66/DI, nylon 66/D6, nylon 66/DT, nylon 66/610, nylon 66/612, a polyamide copolymer, or a combination thereof, wherein the additional polyamide is ≥15 to ≤85 wt % of the composition, or ≥20 to ≤85 wt %, ≥15 to ≤80 wt %, ≥15 to ≤75 wt %, ≥15 to ≤70 wt % of the composition, or less than or equal to 85 wt % but equal to or greater than 15 wt %, 20, 25, 30, 35, 40, 45, 50, 55, 60, 65, 70, 75, or 80 wt % of the composition.

Aspect 40 provides an article comprising the composition of any one of Aspects 1-24, the reacted composition of any one of Aspects 25-28, the compounded polyamide composition of any one of Aspects 31-39, or a combination thereof.

Aspect 41 provides the article of Aspect 40, wherein the article is an extrudate.

Aspect 42 provides the article of any one of Aspects 40-41, wherein the article is a molded article.

Aspect 43 provides the article of any one of Aspects 40-41, wherein the article is a conduit.

Aspect 44 provides the article of Aspect 43, wherein the article is an extruded conduit, such as a monolayer or multi-layer conduit. Monolayer conduits can optionally include up to 2 wt % (actives) UV-grade colorant. Multi-layered conduits can include inside/outside surface skin layers and can include up to 1 wt % (actives) non-UV grade colorant.

Aspect 45 provides the article of Aspect 44, wherein the extruded conduit is substantially free of glass fibers.

Aspect 46 provides the article of Aspect 45, wherein the extruded conduit is selected from the group consisting of rigid, flexible, curved, bent, serpentine, partially corrugated and fully corrugated.

Aspect 47 provides the article of Aspects 45-46, wherein a cross-section of the extruded conduit that is substantially free of glass fibers is selected from the group consisting of round, oval, oblong, square, rectangle, triangle, star and polygonal.

Aspect 48 provides the article of Aspects 45-47, wherein the extruded conduit that is substantially free of glass fibers is a tube.

Aspect 49 provides the article of Aspects 45-48, wherein the extruded conduit that is substantially free of glass fibers is a pipe.

Aspect 50 provides the article of any one of Aspects 44-49, wherein the extruded conduit is resistant to glycolysis.

Aspect 51 provides the article of any one of Aspects 43-50, wherein the conduit is chosen from rigid, flexible, curved, bent, serpentine, partially corrugated, fully corrugated, and a combination thereof.

Aspect 52 provides the article of any one of Aspects 43-51, wherein the conduit has a cross-section chosen from round, oval, oblong, square, rectangle, triangle, star, polygonal, and a combination thereof.

Aspect 53 provides the article of any one of Aspects 40-44 or 50-52, wherein the article comprises from ≥15 to ≤50% glass fiber and exhibits superior resistance to at least one of chemical, fuel/oil, hydrolysis, glycolysis, and salt exposure, as compared to a control, wherein the control differs by at least one of AEG, weight percentage of maleated polyolefin, and degree of maleation of the maleated polyolefin.

Aspect 54 provides the article of Aspect 53, wherein the article is a molded article.

Aspect 55 provides the article of Aspect 54, wherein the molded article is resistant to cold-temperature cracking.

Aspect 56 provides the article of any one of Aspects 40-55, wherein the article is characterized by one or more superior properties as compared to a control.

Aspect 57 provides the article of any one of Aspects 40-56, wherein
the article is characterized by superior resistance to at least one selected from:
cold-temperature cracking,
urea exposure,
fuel exposure,
oil exposure,
high-temperature exposure,
hydrolysis,
glycolysis, and
salt exposure,
when compared against a control.

Aspect 58 provides the article of Aspect 57, wherein the salt is $ZnCl_2$.

Aspect 59 provides the article of any one of Aspects 56-58, wherein the control is the same composition except that the polyamide in the control has an AEG of <60 meq/kg.

Aspect 60 provides the article of any one of Aspects 56-59, wherein the control is the same composition except that the control contains less than 0.05 wt % maleated polyolefin, and the balance of the composition is the polyamide.

Aspect 61 provides the article of any one of Aspects 56-60, wherein the article is characterized by superior mechanical strength, as compared to the control.

Aspect 62 provides the article of any one of Aspects 56-61, wherein the article has a Flame Resistance rating of V-0.

Aspect 63 provides the composition of any one of Aspects 1-24, the reacted composition of any one of Aspects 25-28, the compounded polyamide composition of any one of Aspects 31-39, or the article of any one of Aspects 40-62, having a tensile strength of at least 30 MPa, or having a melt strength of at least 0.1 Newton, or a combination thereof.

Aspect 64 provides the composition of any one of Aspects 1-24, the reacted composition of any one of Aspects 25-28, the compounded polyamide composition of any one of Aspects 31-39, or the article of any one of Aspects 40-63, having a tensile strength of 30-200 MPa, or having a melt strength of at least 0.1 Newton, or a combination thereof.

Aspect 65 provides the composition of any one of Aspects 1-24, the reacted composition of any one of Aspects 25-28, the compounded polyamide composition of any one of Aspects 31-39, or the article of any one of Aspects 40-64, having a tensile strength of 40-150 MPa, or having a melt strength of at least 0.1 Newton, or a combination thereof.

Aspect 66 provides the composition of any one of Aspects 1-24, the reacted composition of any one of Aspects 25-28, the compounded polyamide composition of any one of Aspects 31-39, or the article of any one of Aspects 40-65, wherein the article has a tensile strength, measured according to ISO 527 on dry-as-molded specimens, of at least 40 MPa, and a notched Charpy impact energy, measured at −30° C. and according to ISO 179/1eA on dry-as-molded specimens, of at least 60 kJ/m$^2$.

Aspect 67 provides the composition of any one of Aspects 1-24, the reacted composition of any one of Aspects 25-28, the compounded polyamide composition of any one of Aspects 31-39, or the article of any one of Aspects 40-66, which retains ≥50% of the tensile yield strength, tensile elongation at break, and tensile break strength after undergoing 1:1 (vol/vol) ethylene glycol:water exposure at 120° C.-130° C. for 1000 hrs.

Aspect 68 provides the composition of any one of Aspects 1-24, the reacted composition of any one of Aspects 25-28, the compounded polyamide composition of any one of Aspects 31-39, or the article of any one of Aspects 40-67, which retains ≥50% of the tensile yield strength, tensile elongation at break, and tensile break strength after undergoing 50 wt % aqueous zinc chloride solution exposure at 23° C. for 200 hours under 3% applied strain to the test specimens.

Aspect 69 provides the composition of any one of Aspects 1-24, the reacted composition of any one of Aspects 25-28, the compounded polyamide composition of any one of Aspects 31-39, or the article of any one of Aspects 40-68, which, upon heat aging at 140° C. for 1000 hours, has a tensile yield strength, measured according to ISO 527, of at least 40 MPa, a notched Charpy impact energy, measured at 23° C. and according to ISO 179/1eA of at least 45 kJ/m$^2$.

Aspect 70 provides the composition of any one of Aspects 1-24, the reacted composition of any one of Aspects 25-28, the compounded polyamide composition of any one of Aspects 31-39, or the article of any one of Aspects 40-69, which upon heat aging at 140° C. for 1000 hours has a tensile break strength measured according to ISO 527 of at least 30 MPa, and a tensile elongation at break measured according to ISO 527 is at least 5%.

Aspect 71 provides a method of making the composition of any one of Aspects 1-24, the reacted composition of any one of Aspects 25-28, or a combination thereof comprising:
combining the condensation polyamide and the maleated polyolefin to form the composition of any one of Aspects 1-24, the reacted composition of any one of Aspects 25-28, or a combination thereof.

Aspect 72 provides the method of Aspect 71, wherein the method is a method of making the reacted composition of any one of Aspects 25-28, further comprising at least partially reacting the condensation polyamide and the maleated polyolefin to form the reacted composition of any one of Aspects 25-28.

Aspect 73 provides the method of any one of Aspects 71-72, wherein the method is a method of improving glycolysis resistance of the condensation polyamide, wherein the composition of any one of Aspects 1-24 or the reacted composition of any one of Aspects 25-28 has greater glycolysis resistance than the condensation polyamide.

Aspect 74 provides the method of any one of Aspects 71-73, wherein the method comprises combining the condensation polyamide and the maleated polyolefin to form the composition of any one of Aspects 1-24, the reacted composition of any one of Aspects 25-28, or a combination thereof, in the absence of added glass fibers.

Aspect 75 provides a method of making the compounded composition of any one of Aspects 31-39 comprising:
combining the composition of any one of Aspects 1-24, the reacted composition of any one of Aspects 25-28, or a combination thereof, with one or more other components to form the compounded polyamide composition of any one of Aspects 31-39.

Aspect 76 provides the method of any one of Aspects 71-75, wherein the method comprises combining the condensation polyamide and the maleated polyolefin before adding a chain extender thereto.

Aspect 77 provides the method of any one of Aspects 75-76, comprising:
providing to a first compounder extruder zone a feed comprising the condensation polyamide and the maleated polyolefin (e.g., at least 30 wt % condensation polyamide, from ≥10 wt % to ≤50 wt % or ≥15 wt % to ≤50 wt % of the maleated polyolefin, and optionally ≥20 wt % to ≤85 wt % of the additional polyamide);
maintaining the first compounder extruder zone conditions sufficient to obtain a first compounded polyamide melt inside the first compounder extruder zone;
introducing a chain extender to the first compounded polyamide melt in a second compounder extruder zone; and
maintaining the second compounder extruder zone conditions sufficient to obtain a second compounded polyamide melt inside the second compounder extruder zone, wherein the second compounded polyamide melt is the composition of any one of Aspects 1-24, the reacted composition of any one of Aspects 25-28, or the compounded composition of any one of Aspects 31-39.

Aspect 78 provides the method of Aspect 77, wherein the first compounder extruder zone is substantially free of the chain extender.

Aspect 79 provides the method of any one of Aspects 77-78, wherein the first compounder extruder zone is substantially free of chain extenders.

Aspect 80 provides the method of any one of Aspects 77-79, wherein the chain extender is ≥0.05 to ≤5 wt % of the second compounded polyamide melt.

Aspect 81 provides the method of any one of Aspects 77-80, wherein a barrel of a screw extruder (e.g., a single screw extruder, a vented twin-screw extruder, or an unvented twin-screw extruder) comprises the first compounder extruder zone and the second compounder extruder zone, wherein the providing of the feed to the first compounder extrusion zone comprises providing the feed to a feed inlet of the barrel, wherein the barrel has a length.

Aspect 82 provides the method of Aspect 81, wherein the chain extender is introduced to the second compounder extruder zone at least ¼ of the length of the barrel from the feed inlet of the barrel.

Aspect 83 provides the method of any one of Aspects 81-82, wherein the chain extender is introduced to the second compounder extruder zone at least ½ of the length of the barrel from the feed inlet of the barrel.

Aspect 84 provides the method of any one of Aspects 81-83, wherein the chain extender is introduced to the second compounder extruder zone at least ¾ of the length of the barrel from the feed inlet of the barrel.

Aspect 85 provides the method of any one of Aspects 81-84, wherein the chain extender is introduced to the second compounder extruder zone at least ¼ of the length of the barrel from the feed inlet of the barrel and sufficiently far from an outlet of the barrel to provide mixing of the chain extender with the first compounded polyamide melt to form the second compounded polyamide melt.

Aspect 86 provides the method of any one of Aspects 77-85, wherein the introducing of the chain extender to the first compounded polyamide melt in the second compounder extruder zone comprises introducing the chain extender to the first compounded polyamide melt after at least 50 wt % of the maleated polyolefin fed has incorporated into the condensation polyamide.

Aspect 87 provides the method of Aspect 86, wherein the incorporation into the condensation polyamide comprises homogeneous blending (e.g., on a molecular level, or of domains of the maleated polyolefin or a reaction product thereof).

Aspect 88 provides the method of any one of Aspects 86-87, wherein the incorporation into the condensation polyamide comprises formation of a reaction product of the maleated polyolefin.

Aspect 89 provides the method of any one of Aspects 86-88, wherein the incorporation into the condensation polyamide comprises reaction of the maleated polyolefin with the condensation polyamide.

Aspect 90 provides the method of any one of Aspects 86-89, wherein the incorporation into the condensation polyamide comprises formation of domains of the maleated polyolefin or a reaction product thereof in the condensation polyamide.

Aspect 91 provides the method of any one of Aspects 86-90, wherein the introducing of the chain extender to the first compounded polyamide melt in the second compounder extruder zone comprises introducing the chain extender to the first compounded polyamide melt after at least 60 wt % of the maleated polyolefin has incorporated into the condensation polyamide.

Aspect 92 provides the method of any one of Aspects 86-91, wherein the introducing of the chain extender to the first compounded polyamide melt in the second compounder extruder zone comprises introducing the chain extender to the first compounded polyamide melt after at least 70 wt % of the maleated polyolefin has incorporated into the condensation polyamide.

Aspect 93 provides the method of any one of Aspects 86-92, wherein the introducing of the chain extender to the first compounded polyamide melt in the second compounder extruder zone comprises introducing the chain extender to the first compounded polyamide melt after at least 80 wt % of the maleated polyolefin has incorporated into the condensation polyamide.

Aspect 94 provides the method of any one of Aspects 86-93, wherein the introducing of the chain extender to the first compounded polyamide melt in the second compounder extruder zone comprises introducing the chain extender to the first compounded polyamide melt after at least 90 wt % of the maleated polyolefin has incorporated into the condensation polyamide.

Aspect 95 provides the method of any one of Aspects 86-94, wherein the introducing of the chain extender to the first compounded polyamide melt in the second compounder extruder zone comprises introducing the chain extender to the first compounded polyamide melt after about 100 wt % of the maleated polyolefin has incorporated into the condensation polyamide.

Aspect 95 provides the method of any one of Aspects 77-95, further comprising producing extrudate from the second compounded polyamide melt.

Aspect 96 provides the method of any one of Aspects 77-95, further comprising producing a molded article from the second compounded polyamide melt.

Aspect 97 provides a method of extrusion of a polyamide resin, the method comprising:
providing a polyamide resin comprising the composition of any one of Aspects 1-24, the reacted composition of any one of Aspects 25-28, the compounded polyamide composition of any one of Aspects 31-39, or a combination thereof, to a feed zone of an extruder;
maintaining extruder barrel conditions sufficiently to obtain the polyamide resin melt inside the extruder; and
producing extrudate from the extruder while optionally recovering vapor from the extruder via a vacuum draw.

Aspect 98 provides a method of molding of a polyamide resin, the method comprising:
providing a polyamide resin comprising the composition of any one of Aspects 1-24, the reacted composition of any one of Aspects 25-28, the compounded polyamide composition of any one of Aspects 31-39, or a combination thereof, to a mold; and
producing a molded polyamide resin from the mold.

Aspect 99 provides the composition, reacted composition, compounded composition, article, or of any one or any combination of Embodiments 1-98 optionally configured such that all elements or options recited are available to use or select from.

What is claimed is:

1. A compounded polyamide composition comprising:
a condensation polyamide composition, a reacted composition that is a reaction product of the condensation polyamide composition, or a combination thereof;
wherein the condensation polyamide composition comprises
a condensation polyamide that is nylon 66, wherein the condensation polyamide has an amine end group (AEG) number of ≥65 milliequivalents per kg (meq/kg) and ≤130 meq/kg and has an RV of ≥35 and ≤100, as determined by the formic acid method of ASTM D789, wherein the condensation polyamide is at least 30 wt % of the compounded polyamide composition, wherein the condensation polyamide has a higher concentration than any other polyamide in the compounded polyamide composition,
from ≥10 wt % to ≤50 wt % of a maleated polyolefin, wherein the maleated polyolefin comprises maleic anhydride grafted onto a polyolefin backbone, the maleated polyolefin having a grafted maleic anhydride incorporation of ≥0.05 to ≤1.5 wt % based on total weight of the maleated polyolefin, and
from ≥15 wt % to <45 wt % of a polyamide copolymer chosen from nylon 66/DI, nylon 66/D6, nylon 66/DT, nylon 66/610, nylon 66/612, or a combination thereof; and
the reacted composition comprises a polyamide-polyolefin copolymer formed from at least partial reaction of the condensation polyamide and the maleated polyolefin.

2. The compounded polyamide composition of claim 1, wherein the maleated polyolefin, or domains of the maleated polyolefin, is/are uniformly distributed in the condensation polyamide or in the compounded polyamide composition.

3. The compounded polyamide composition of claim 1, wherein the polyamide copolymer is PA66/DI.

4. An article comprising the compounded polyamide composition of claim 1.

5. The article of claim 4, wherein:
the article is an extruded conduit that is substantially free of glass fibers, or
the article is a molded article that further comprises glass fibers.

6. A method of making the compounded polyamide composition of claim 1, comprising:
combining the condensation polyamide, the maleated polyolefin, and the polyamide copolymer to form the compounded polyamide composition.

7. The method of claim 6, wherein the method further comprises adding a chain extender to the condensation polyamide, the maleated polyolefin, and the polyamide copolymer, or a reaction product thereof, to form the compounded polyamide composition, wherein the chain extender comprises an alternating maleic anhydride-olefin copolymer.

8. The method of claim 7, comprising:
providing to a first compounder extruder zone a feed comprising the condensation polyamide, the polyamide copolymer, and the maleated polyolefin;
maintaining the first compounder extruder zone conditions sufficient to obtain a first compounded polyamide melt inside the first compounder extruder zone;
introducing the chain extender to the first compounded polyamide melt in a second compounder extruder zone; and
maintaining the second compounder extruder zone conditions sufficient to obtain a second compounded polyamide melt inside the second compounder extruder zone, wherein the second compounded polyamide melt is the compounded polyamide composition.

9. A method of extrusion of a polyamide resin, the method comprising:
providing the compounded polyamide composition of claim 1 to a feed zone of an extruder;
maintaining extruder barrel conditions sufficiently to obtain a polyamide resin melt inside the extruder; and
producing extrudate from the extruder while optionally recovering vapor from the extruder via a vacuum draw.

10. A method of molding of a polyamide resin, the method comprising:
providing the compounded polyamide composition of claim 1 to a mold; and
producing a molded polyamide resin from the mold.

11. The compounded polyamide composition of claim 1, wherein the compounded polyamide composition further comprises a chain extender that is ≥0.05 to ≤5 wt % of the compounded polyamide composition, wherein the chain extender is a maleic anhydride-olefin copolymer.

12. An article comprising:
a condensation polyamide composition, a reacted composition that is a reaction product of the condensation polyamide composition, a compounded polyamide composition, or a combination thereof;
wherein
the condensation polyamide composition comprises
a condensation polyamide that is nylon 66, wherein the condensation polyamide has an amine end group (AEG) number of ≥65 milliequivalents per kg (meq/kg) and ≤130 meq/kg and has an RV of ≥35 and ≤100, as determined by the formic acid method of ASTM D789, wherein the condensation polyamide is at least 30 wt % of the condensation polyamide composition, wherein the condensation polyamide has a higher concentration than any other polyamide in the condensation polyamide composition,
from ≥10 wt % to ≤50 wt % of a maleated polyolefin, wherein the maleated polyolefin comprises maleic anhydride grafted onto a polyolefin backbone, the maleated polyolefin having a grafted maleic anhydride incorporation of ≥0.05 to ≤1.5 wt % based on total weight of the maleated polyolefin, and
from ≥15 wt % to >45 wt % of a polyamide copolymer chosen from nylon 66/DI, nylon 66/D6, nylon 66/DT, nylon 66/610, nylon 66/612, or a combination thereof;
the reacted composition comprises a polyamide-polyolefin copolymer formed from at least partial reaction of the condensation polyamide and the maleated polyolefin; and
the compounded polyamide composition comprises the condensation polyamide composition, the reacted composition, or a combination thereof.

13. The article of claim 12, wherein:
the article is an extruded conduit that is substantially free of glass fibers, or
the article is a molded article that further comprises glass fibers.

14. The article of claim 12, wherein the article comprises the compounded polyamide composition, wherein the compounded polyamide composition further comprises, chain extender at a concentration of ≥0.05 to ≤5 wt % of the compounded polyamide, the polyamide copolymer, composition, wherein the chain extender comprises an alternating maleic anhydride-olefin copolymer.

15. A method of making the article of claim 14, the method comprising:
extruding or molding the compounded polyamide composition to form the article; wherein the method further comprises making the condensation polyamide composition, the reacted composition, or a combination thereof, comprising combining the condensation polyamide and the maleated polyolefin before adding the chain extender thereto.

16. The method of claim 15, comprising:
providing to a first compounder extruder zone a feed comprising the condensation polyamide and the maleated polyolefin;
maintaining the first compounder extruder zone conditions sufficient to obtain a first compounded polyamide melt inside the first compounder extruder zone;
introducing the chain extender to the first compounded polyamide melt in a second compounder extruder zone; and
maintaining the second compounder extruder zone conditions sufficient to obtain a second compounded polyamide melt inside the second compounder extruder zone, wherein the second compounded polyamide melt is the compounded polyamide composition.

17. The method of claim 16, wherein
a barrel of a screw extruder comprises the first compounder extruder zone and the second compounder extruder zone;
the providing of the feed to the first compounder extrusion zone comprises providing the feed to a feed inlet of the barrel;
the barrel has a length; and
the chain extender is introduced to the second compounder extruder zone at least 1/4 of the length of the barrel from the feed inlet of the barrel.

18. The method of claim 16, wherein the introducing of the chain extender to the first compounded polyamide melt in the second compounder extruder zone comprises introducing the chain extender to the first compounded polyamide melt after at least 50 wt % of the maleated polyolefin fed has incorporated into the condensation polyamide.

19. The article of claim 12, wherein the maleated polyolefin, or domains of the maleated polyolefin, is/are uniformly distributed in the condensation polyamide or in the condensation polyamide composition.

20. The article of claim 12, wherein the polymide copolymer is PA66/DI.

21. A method of making the article of claim 12, the method comprising:
- extruding or molding the compounded polyamide composition to form the article.

22. The article of claim 12, wherein when compared against a control that differs by at least one of amine end group (AEG) number of the condensation polyamide, weight percentage of maleated polyolefin, and degree of maleation of the maleated polyolefin, the article is characterized by superior resistance to at least one selected from
- cold-temperature cracking,
- urea exposure,
- fuel exposure,
- oil exposure,
- high-temperature exposure,
- hydrolysis,
- glycolysis, and
- salt exposure.

* * * * *